US005799073A

United States Patent [19]

Fleischer, III et al.

[11] Patent Number: 5,799,073
[45] Date of Patent: Aug. 25, 1998

[54] APPARATUS AND METHOD FOR RECORDING CALL RELATED DATA

[75] Inventors: Harold C. Fleischer, III; Michael W. Boeckman; S. James Merin; Donald Austin; Brenda Thompson, all of St. Louis, Mo.

[73] Assignee: Southwestern Bell Technology Resources, Inc., Austin, Tex.

[21] Appl. No.: 473,919

[22] Filed: Jun. 7, 1995

[51] Int. Cl.$^6$ .................................................. H04M 15/04
[52] U.S. Cl. ....................... 379/113; 379/116; 379/120; 379/121; 379/134; 379/230; 395/2.79
[58] Field of Search ................................. 379/111, 112, 379/113, 114, 115, 116, 119, 120, 121, 133, 134, 135, 140, 230, 207; 395/2.79, 600

[56] References Cited

U.S. PATENT DOCUMENTS

| | | |
|---|---|---|
| 4,191,860 | 3/1980 | Weber . |
| 4,313,035 | 1/1982 | Jordan et al. . |
| 4,611,094 | 9/1986 | Asmuth et al. . |
| 4,611,096 | 9/1986 | Asmuth et al. ........................ 379/230 |
| 4,756,020 | 7/1988 | Fodale ................................. 379/112 |
| 4,757,267 | 7/1988 | Riskin ................................. 379/113 |
| 4,788,718 | 11/1988 | McNabb et al. ..................... 379/113 |
| 4,802,199 | 1/1989 | Lange et al. ........................ 379/221 |
| 4,899,373 | 2/1990 | Lee et al. ............................ 379/207 |
| 5,003,584 | 3/1991 | Benyacar et al. ................... 379/135 |
| 5,247,571 | 9/1993 | Kay et al. ............................ 379/207 |
| 5,315,641 | 5/1994 | Montgomery et al. ................ 379/94 |
| 5,325,290 | 6/1994 | Cauffman et al. .................. 379/112 |
| 5,333,183 | 7/1994 | Herbert ............................... 379/112 |
| 5,353,331 | 10/1994 | Emery et al. ........................ 379/58 |
| 5,469,500 | 11/1995 | Satter et al. ........................ 379/201 |
| 5,497,414 | 3/1996 | Bartholomew ...................... 379/201 |

OTHER PUBLICATIONS

"Status of PINs and Remote Access," Bell Communications Research, Technical Memorandum TM-INS-021336, May 29, 1992.

"Class Calling Name Delivery Generic Requirements FSD 01-02-1070," LATA Switching Systems Generic Requirements, Bell Communications Research, Technical Reference TR-NWT-001188, Issue 1 (Dec. 1991).

"Switching System Requirements for Call Control Using the Integrated Services Digital Network User Part (ISDNUP)," Bell Communications Research, Technical Reference TR-TSY-000317, Issue 2 (Jan. 1989).

"Class Feature: Selective Call Acceptance," Bell Communications Research, Technical Advisory TA-TSY-001034, Issue 1 (Apr. 1990).

"Class Feature: Distinctive Ringing/Call Waiting," Bell Communications Research, Technical reference TR-TSY-000219, Issue 2 (Aug. 1988).

"Class Feature: Calling Number Delivery FSD-01-02-1051," Bell Communications Research, Technical Reference TR-TSY-000031, Issue 3 (Jan. 1990).

"ISDN Call Forwarding," Bell Communications Research, Technical Reference TR-TSY-000853, Issue 1 (Dec. 1988).

"ISDN Call Forwarding, Revision 1," Bell Communications Research, Technical Reference TR-TSY-000853, Revision 1 (Dec. 1993).

(List continued on next page.)

*Primary Examiner*—Fan S. Tsang
*Attorney, Agent, or Firm*—Greenblum & Bernstein, P.L.C.

[57] ABSTRACT

An advanced intelligent network application is provided for collecting and recording cumulative call data to a subscriber's telephone number. The subscriber may receive monthly reports regarding incoming telephone traffic with the data formatted according to one or more of the following categories: total calls for the reporting period; quantity of calls by day of month; quantity of calls by hour of day; quantity of calls by local area and exchange (i.e., NPA-NXX); quantity of calls by Zip Code+4; and quantity of calls by demographic code. The report may also provide the subscriber with, e.g., a record of incoming local exchange telephone traffic.

45 Claims, 17 Drawing Sheets

OTHER PUBLICATIONS

"Generic Requirements for ISDN Automatic Recall," Bell Communications Research, Technical Reference TR-NWT-001199, Issue 1 (Feb. 1992).

"Class Feature: Automatic Recall FSD 01-02-1260," Bell Communications Research, Technical Reference TR-NWT-000227, Issue 3 (Jun. 1993).

"Class Feature: Automatic Callback FSD 01-02-1250" Bell Communications Research, Technical Reference TR-NWT-000215, Issue 3 (Jun. 1993).

"Class Feature: Automatic Callback-Bulletin 1," Bell Communications Research, (Apr. 1995).

Berman, Roger K., and Brewster, John H., "Perspectives on the AIN Architecture," IEEE Communications Magazine, Feb. 1992, pp. 27-32.

CUSTOMER ADDRESS-LINE 1  CALLER DATA REPORT  RUN DATE: 08/05/94
CUSTOMER ADDRESS-LINE 2
CUSTOMER ADDRESS-LINE 3
CUSTOMER ADDRESS-LINE 4
CUSTOMER ADDRESS-LINE 5
316 555 1234 123 001

REPORTING PERIOD: 07/01/94 - 07/31/94

TELEPHONE NUMBER: (316) 555-1234

TOTAL QUANTITY OF CALLS

TOTAL QUANTITY OF CALLS: XX,XXX

QUANTITY OF CALLS BY DAY OF MONTH

| SUNDAY | MONDAY | TUESDAY | WEDNESDAY | THURSDAY | FRIDAY | SATURDAY |
|---|---|---|---|---|---|---|
| | | | | | 01 -- XX,XXX | 02 -- XX,XXX |
| 03 -- XX,XXX | 04 -- XX,XXX | 05 -- XX,XXX | 06 -- XX,XXX | 07 -- XX,XXX | 08 -- XX,XXX | 09 -- XX,XXX |
| 10 -- XX,XXX | 11 -- XX,XXX | 12 -- XX,XXX | 13 -- XX,XXX | 14 -- XX,XXX | 15 -- XX,XXX | 16 -- XX,XXX |
| 17 -- XX,XXX | 18 -- XX,XXX | 19 -- XX,XXX | 20 -- XX,XXX | 21 -- XX,XXX | 22 -- XX,XXX | 23 -- XX,XXX |
| 24 -- XX,XXX | 25 -- XX,XXX | 26 -- XX,XXX | 27 -- XX,XXX | 28 -- XX,XXX | 29 -- XX,XXX | 30 -- XX,XXX |
| 31 -- XX,XXX | | | | | | |
| TOT - XX,XXX | TOT - XX,XXX | TOT - XX,XXX | TOT - XX,XXX | TOT - XX,XXX | TOT - XX,XXX | TOT - XX,XXX |

QUANTITY OF CALLS BY HOUR OF DAY

0000 - 0059 -- XX,XXX    1200 - 1259 -- XX,XXX
    0100 - 0159 -- XX,XXX    1300 - 1359 -- XX,XXX
    0200 - 0259 -- XX,XXX    1400 - 1459 -- XX,XXX
    0300 - 0359 -- XX,XXX    1500 - 1559 -- XX,XXX
    0400 - 0459 -- XX,XXX    1600 - 1659 -- XX,XXX
    0500 - 0559 -- XX,XXX    1700 - 1759 -- XX,XXX
    0600 - 0659 -- XX,XXX    1800 - 1859 -- XX,XXX
    0700 - 0759 -- XX,XXX    1900 - 1959 -- XX,XXX
    0800 - 0859 -- XX,XXX    2000 - 2059 -- XX,XXX
    0900 - 0959 -- XX,XXX    2100 - 2159 -- XX,XXX
    1000 - 1059 -- XX,XXX    2200 - 2259 -- XX,XXX
    1100 - 1159 -- XX,XXX    2300 - 2359 -- XX,XXX

QUANTITY OF CALLS BY DEMOGRAPHIC CODE

| 01 -- XX,XXX | 11 -- XX,XXX | 21 -- XX,XXX | 31 -- XX,XXX | 41 -- XX,XXX |
|---|---|---|---|---|
| 02 -- XX,XXX | 12 -- XX,XXX | 22 -- XX,XXX | 32 -- XX,XXX | 42 -- XX,XXX |
| 03 -- XX,XXX | 13 -- XX,XXX | 23 -- XX,XXX | 33 -- XX,XXX | 43 -- XX,XXX |
| 04 -- XX,XXX | 14 -- XX,XXX | 24 -- XX,XXX | 34 -- XX,XXX | 44 -- XX,XXX |
| 05 -- XX,XXX | 15 -- XX,XXX | 25 -- XX,XXX | 35 -- XX,XXX | 45 -- XX,XXX |
| 06 -- XX,XXX | 16 -- XX,XXX | 26 -- XX,XXX | 36 -- XX,XXX | 46 -- XX,XXX |
| 07 -- XX,XXX | 17 -- XX,XXX | 27 -- XX,XXX | 37 -- XX,XXX | 47 -- XX,XXX |
| 08 -- XX,XXX | 18 -- XX,XXX | 28 -- XX,XXX | 38 -- XX,XXX | 48 -- XX,XXX |
| 09 -- XX,XXX | 19 -- XX,XXX | 29 -- XX,XXX | 39 -- XX,XXX | 49 -- XX,XXX |
| 10 -- XX,XXX | 20 -- XX,XXX | 30 -- XX,XXX | 40 -- XX,XXX | 50 -- XX,XXX |

BUSINESS -- XX,XXX
    UNKNOWN -- XX,XXX

CUSTOMER INQUIRIES SHOULD BE REFERRED TO 1-800-

FIG. 6A

CUSTOMER ADDRESS-LINE 1
CUSTOMER ADDRESS-LINE 2        CALLER DATA REPORT        RUN DATE: 08/05/94
CUSTOMER ADDRESS-LINE 3
CUSTOMER ADDRESS-LINE 4
CUSTOMER ADDRESS-LINE 5
316 555 1234 123 001

REPORTING PERIOD: 07/01/94 - 07/31/94

TELEPHONE NUMBER: (316) 555-1234

QUANTITY OF CALLS BY NPA-NXX

KS TOPEKA

| | | | |
|---|---|---|---|
| 316-231 XX,XXX | 316-234 XX,XXX | 316-345 XX,XXX | 316-456 XX,XXX |
| 316-457 XX,XXX | 316-459 XX,XXX | 316-638 XX,XXX | |

TOTAL KS TOPEKA        XX,XXX

KS WICHITA

| | | | |
|---|---|---|---|
| 316-247 XX,XXX | 316-257 XX,XXX | 316-259 XX,XXX | 316-431 XX,XXX |
| 316-432 XX,XXX | 316-437 XX,XXX | 316-438 XX,XXX | 316-439 XX,XXX |

TOTAL KS WICHITA       XX,XXX

TOTAL KS               XX,XXX

MO MEHLVILLE

| | | |
|---|---|---|
| 314-487 XX,XXX | 314-892 XX,XXX | 314-894 XX,XXX |

TOTAL MO MEHLVILLE     XX,XXX

MO ST LOUIS

| | | | |
|---|---|---|---|
| 314-235 XX,XXX | 314-321 XX,XXX | 314-343 XX,XXX | 314-421 XX,XXX |
| 314-422 XX,XXX | 314-423 XX,XXX | 314-424 XX,XXX | 314-465 XX,XXX |
| 314-583 XX,XXX | 314-678 XX,XXX | 314-679 XX,XXX | |

TOTAL MO ST LOUIS      XX,XXX

TOTAL MO               XX,XXX

TOTAL UNKNOWN          XX,XXX

QUANTITY OF CALLS BY ZIP CODE + 4

| | | | |
|---|---|---|---|
| 63101-1234 XX,XXX | 63101-1235 XX,XXX | 63101-3467 XX,XXX | 63102-     XX,XXX |
| 63102-5621 XX,XXX | 65251-6731 XX,XXX | 77234-      XX,XXX | 77234-5370 XX,XXX |
| 77234-7371 XX,XXX | 77234-9362 XX,XXX | | |
| UNKNOWN    XX,XXX | | | |

CUSTOMER INQUIRIES SHOULD BE REFERRED TO 1-800-

FIG. 6B

CALLER DATA REPORT ........
RUN DATE: 08/05/94 ........

CUSTOMER ADDRESS-LINE 1 ........
CUSTOMER ADDRESS-LINE 2 ........
CUSTOMER ADDRESS-LINE 3 ........
CUSTOMER ADDRESS-LINE 4 ........
CUSTOMER ADDRESS-LINE 5 ........
816 331 1234 567 001 ........

REPORTING PERIOD: 07/01/94 - 07/31/94 ........

TELEPHONE NUMBER: (316) 235-9800 ........

TOTAL CALLS, DATE, CALLS BY DATE, HOUR, CALLS BY HOUR, DEMOGRAPHIC CODE, CALLS BY DEMOGRAPHIC CODE, ST TOWN NAME NPA NXX, CALLS BY TOWN NAME NPA NXX, ZIP CODES, CALLS BY ZIP CODES

,01/FRI, #####,0000 - 0059,#####01,#####,KS TOPEKA       316-123,#####, 63101-1234, #####
,02/SAT,       #####,0100 - 0159, #####,02, #####,            ,KS TOPEKA    316-234,#####, 63101-1235, ######
,03/SUN,       #####,0200 - 0259, #####,03, #####,            ,KS TOPEKA    316-345,######, 63101-3467, ######
,04/MON,       #####,0300 - 0359, #####,04, #####,            ,KS TOPEKA    316-456,######, 63102-, ######
,05/TUE,       #####,0400 - 0459, #####,05, #####,            ,KS TOPEKA    316-457,######, 63102-5621, ######
,06/WED,       #####,0500 - 0559, #####,06, #####,            ,KS TOPEKA    316-459,######, 65251-6731, ######
,07/THR,       #####,0600 - 0659, #####,07, #####,            ,KS TOPEKA    316-638,######, 77234-, #####
,08/FRI,       #####,0700 - 0759, #####,08, #####,            ,KS WICHITA   316-189,######, 77234-5370, ######
,09/SAT,       #####,0800 - 0859, #####,09, #####,            ,KS WICHITA   316-257,######, 77234-7371, ######
,10/SUN,       #####,0900 - 0959, #####,10, #####,            ,KS WICHITA   316-259,######, 77234-9362, ######
,11/MON,       #####,1000 - 1059, #####,11, #####,            ,KS WICHITA   316-431,######, UNKNOWN, #####
,12/TUE,       #####,1100 - 1159, #####,12, #####,            ,KS WICHITA   316-432,######,
,13/WED,       #####,1200 - 1259, #####,13, #####,            ,KS WICHITA   316-437,######,
,14/THR,       #####,1300 - 1359, #####,14, #####,            ,KS WICHITA   316-438,######,
,15/FRI,       #####,1400 - 1459, #####,15, #####,            ,KS WICHITA   316-439,######,
,16/SAT,       #####,1500 - 1559, #####,16, #####,            ,MO MEHLVILLE 314-487,######,
,17/SUN,       #####,1600 - 1659, #####,17, #####,            ,MO MEHLVILLE 314-892,######,
,18/MON,       #####,1700 - 1759, #####,18, #####,            ,MO MEHLVILLE 314-894,######,
,19/TUE,       #####,1800 - 1859, #####,19, #####,            ,MO ST LOUIS  314-235,######,
,20/WED,       #####,1900 - 1959, #####,20, #####,            ,MO ST LOUIS  314-321,######,

FIG. 7A-1

```
,21/THR,  ######,2000-2059,#####  ,21,######                                            ,MO ST LOUIS  314-343,######,,
,22/FRI,  ######,2100-2159,######  ,22,######                                           ,MO ST LOUIS  314-421,######,,
,23/SAT,  ######,2200-2259,######  ,23,######                                           ,MO ST LOUIS  314-422,######,,
,24/SUN,  ######,2300-2359,######  ,24,######                                           ,MO ST LOUIS  314-423,######,,
,25/MON,  ######,,,25,######,MO ST LOUIS                                        314-424,######,,
,26/TUE,  ######,,,26,######,MO ST LOUIS                                        314-465,######,,
,27/WED,  ######,,,27,######,MO ST LOUIS                                        314-583,######,,
,28/THR,  ######,,,28,######,MO ST LOUIS                                        314-678,######,,
,29/FRI,  ######,,,29,######,MO ST LOUIS                                        314-679,######,,
,30/SAT,  ######,,,30,######,UNKNOWN,######,,
,31/SUN,  ######,,,31,######,,,,
,,,,32,######,,,,
,,,,33,######,,,,
,,,,34,######,,,,
```

FIG. 7A-2

...., 35, ######,,,,
...., 36, #####,,,,
...., 37, #####,,,,
...., 38, #####,,,,
...., 39, #####,,,,
...., 40, #####,,,,
...., 41, #####,,,,
...., 42, #####,,,,
...., 43, #####,,,,
...., 44, #####,,,,
...., 45, #####,,,,
...., 46, #####,,,,
...., 47, #####,,,,
...., 48, #####,,,,
...., 49, #####,,,,
...., 50, #####,,,,
...., BUSINESS, #####,,,,
...., UNKNOWN, #####,,,,

FIG. 7B

| CALLER DATA REPORT<br>RUN DATE 08/05/94<br>CUSTOMER ADDRESS LINE 1<br>CUSTOMER ADDRESS LINE 2<br>CUSTOMER ADDRESS LINE 3<br>CUSTOMER ADDRESS LINE 4<br>CUSTOMER ADDRESS LINE 5<br>316 555 1234 123 001<br>REPORTING PERIOD 07/01/94 07/31/94 | | | | | | | | |
|---|---|---|---|---|---|---|---|---|
| TELEPHONE NUMBER (316) 555 1234 | | | | | | | | |
| TOTAL CALLS | DATE | CALLS BY DATE | HOUR | CALLS BY HOUR | DEMOGRAPHIC CODE | CALLS BY DEMOGRAPHIC CODE | ST | TOWN NAME | NPA NXX |
| ##### | 01/FRI | ###### | 0000 0059 | ####### | 1 | ###### | KS | TOPEKA | 316 123 |
| | 02/SAT | ###### | 0100 0159 | ####### | 2 | ###### | KS | TOPEKA | 316 234 |
| | 03/SUN | ###### | 0200 0259 | ####### | 3 | ###### | KS | TOPEKA | 316 346 |
| | 04/MON | ###### | 0300 0359 | ####### | 4 | ###### | KS | TOPEKA | 316 456 |
| | 05/TUE | ###### | 0400 0459 | ####### | 5 | ###### | KS | TOPEKA | 316 457 |
| | 06/WED | ###### | 0500 0559 | ####### | 6 | ###### | KS | TOPEKA | 316 459 |
| | 07/THR | ###### | 0600 0659 | ####### | 7 | ###### | KS | TOPEKA | 316 638 |
| | 08/FRI | ###### | 0700 0759 | ####### | 8 | ###### | KS | TOPEKA | 316 189 |
| | 09/SAT | ###### | 0800 0859 | ####### | 9 | ###### | KS | WICHITA | 316 257 |
| | 10/SUN | ###### | 0900 0959 | ####### | 10 | ###### | KS | WICHITA | 316 259 |
| | 11/MON | ###### | 1000 1059 | ####### | 11 | ###### | KS | WICHITA | 316 431 |
| | 12/TUE | ###### | 1100 1159 | ####### | 12 | ###### | KS | WICHITA | 316 432 |
| | 13/WED | ###### | 1200 1259 | ####### | 13 | ###### | KS | WICHITA | 316 437 |
| | 14/THR | ###### | 1300 1359 | ####### | 14 | ###### | KS | WICHITA | 316 438 |
| | 15/FRI | ###### | 1400 1459 | ####### | 15 | ###### | KS | WICHITA | 316 439 |
| | 16/SAT | ###### | 1500 1559 | ####### | 16 | ###### | MO | MEHLVILLE | 314 487 |
| | 17/SUN | ###### | 1600 1659 | ####### | 17 | ###### | MO | MEHLVILLE | 314 892 |
| | 18/MON | ###### | 1700 1759 | ####### | 18 | ###### | MO | MEHLVILLE | 314 894 |
| | 19/TUE | ###### | 1800 1859 | ####### | 19 | ###### | MO | ST LOUIS | 314 235 |
| | 20/WED | ###### | 1900 1959 | ####### | 20 | ###### | MO | ST LOUIS | 314 321 |

| 21/THR | 2000 | | | BUSINESS UNKNOWN | MO ST LOUIS | 314 343 |
| 22/FRI | 2100 | | 22 | | MO ST LOUIS | 314 421 |
| 23/SAT | 2200 | | 23 | | MO ST LOUIS | 314 422 |
| 24/SUN | 2300 | | 24 | | MO ST LOUIS | 314 423 |
| 25/MON | 2059 | | 25 | | MO ST LOUIS | 314 424 |
| 26/TUE | 2159 | | 26 | | MO ST LOUIS | 314 485 |
| 27/WED | 2259 | | 27 | | MO ST LOUIS | 314 583 |
| 28/THR | 2359 | | 28 | | MO ST LOUIS | 314 678 |
| 29/FRI | | | 29 | | UNKNOWN | 314 679 |
| 30/SAT | | | 30 | | | |
| 31/SUN | | | 31-50 | | | |

| CALLS BY ST TOWN NAME NPA NXX | ZIP CODE + 4 | CALLS BY ZIP CODE + 4 |
|---|---|---|
| ###### | 63101 1234 | ###### |
| ###### | 63101 1235 | ###### |
| ###### | 63101 3467 | ###### |
| ###### | 63102 | ###### |
| ###### | 63102 5621 | ###### |
| ###### | 65251 6731 | ###### |
| ###### | 77234 | ###### |
| ###### | 77234 5370 | ###### |
| ###### | 77234 7371 | ###### |
| ###### | 77234 9362 | ###### |
| ###### | UNKNOWN | ###### |

FIG. 8C

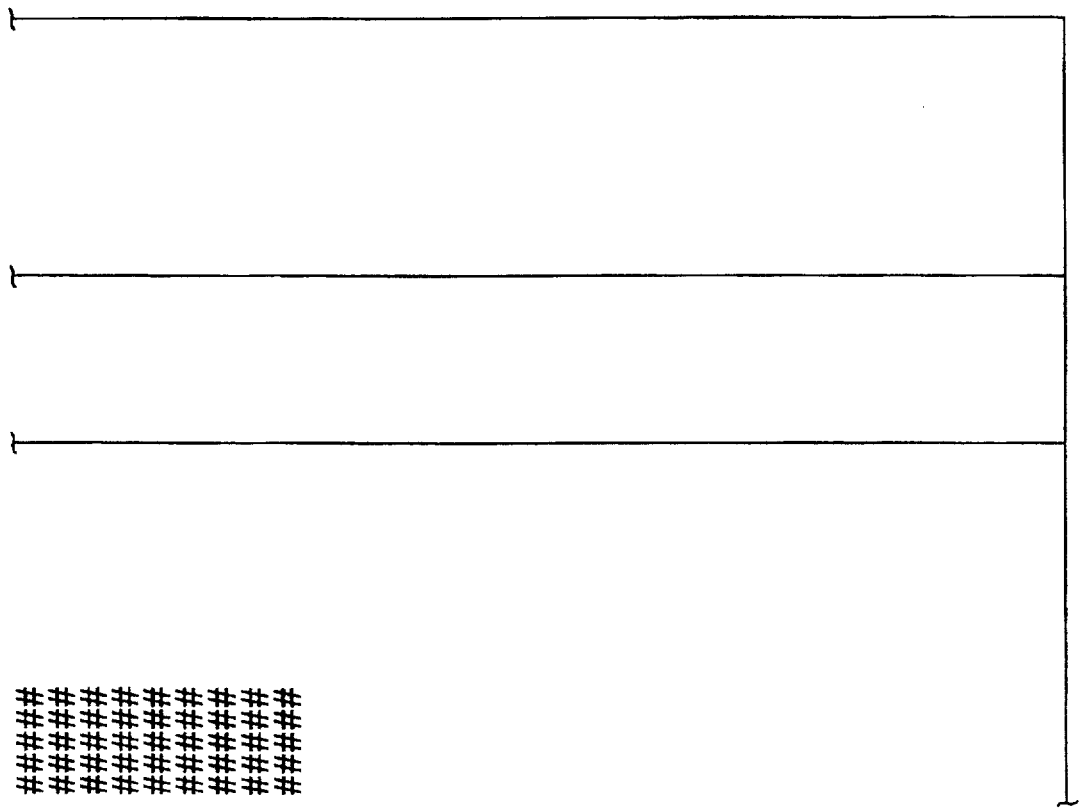

1
APPARATUS AND METHOD FOR RECORDING CALL RELATED DATA

BACKGROUND OF THE INVENTION

Field of the Invention

The present invention generally relates to an apparatus and method for recording call related data in an communications network. More particularly, the present invention relates to an application in an Advanced Intelligent Network (AIN) for recording call related data and providing subscribers with a reports package, configured to their specifications, that contains aggregate call related information on, for example, incoming telephone calls.

Acronyms

The written description provided herein contains acronyms which refer to various communication services and system components. Although known, use of several of these acronyms is not strictly standardized in the art. For purposes of the written description herein, acronyms will be defined as follows:

ACP—Action Control point
AIN—Advanced Intelligent Network
CCIS—Common Channel Interoffice Signalling
CCS—Common Channel Signalling
CNOC—Company Network Operations Center
CO—Central Office
CPR—Call processing Record
DID—Direct Inward Dialing
DRS—Data and Reports System
ISCP—Integrated Service Control point
LATA—Local Access and Transport Arrangement
NPA—Number plan Area, i.e., area code
NXX—Central Office Designation
OSDN—Originating Station Directory Number
SCP—Service Control point
SMDR—Station Message Detail Recording
SS7—Signalling System 7
SSP—Service Switching point
STP—Signaling Transfer point
TCAP—Transaction Capabilities Applications protocol
TCP/IP—Transmission Control protocol/Internet protocol
WAN—Wide Area Network

Background and Material Information

In recent years, a number of new telephone service features have been provided by an Advanced Intelligent Network (AIN). The AIN evolved out of a need to increase the capabilities of the telephone network architecture to meet the growing needs of telephone customers. The AIN architecture generally comprises two networks, a data messaging network and a trunked communications network. The trunked communications network handles voice and data communications between geographically dispersed network locations, whereas the data messaging network is provided for controlling operations of the trunked communications network.

An illustration of the basic components of an AIN architecture is shown in FIG. 9. As shown in FIG. 9, Central Offices (CO) 64–70 are provided for sending and receiving data messages from an Integrated Service Control point (ISCP) 56 via a Switching Transfer point (STP) 58–62. The data messages are communicated to and from the COs 64–70 and the ISCP 56 along a Common Channel Signaling (CCS) network 88. Each CO 64–70 serves as a network Service Switching point (SSP) to route telephone calls between a calling station (e.g., station 72) and a called station (e.g., station 84) through the trunked communications network 90–92. For more information regarding AIN, see Berman, Roger K., and Brewster, John H., "perspectives on the AIN Architecture," IEEE Communications Magazine, February 1992, pp. 27–32, the disclosure of which is expressly incorporated herein by reference in its entirety.

A number of features provided by the prior AIN or AIN-type intelligent networks relate to specialized call processing of incoming calls.

For example, U.S. Pat. No. 4,191,860, to WEBER, provides for special processing of calls, such as INward WATS (Wide Area Telephone Service) calls, via a number of local switching offices based on information stored in a central database. The central database is located at a remote Service Control point (SCP). The local and toll offices of the telephone network compile a call data message via a CCIS link to the central database. The database at the SCP translates the dialed INWATS number into an unlisted destination telephone number based on an originating area code. The unlisted destination number is returned to the central offices via the CCIS link, and the call is completed. When the number of telephone calls to the unlisted number per unit time exceeds a threshold, the database instructs the telephone system to inhibit such calls from being connected for a predetermined period of time.

U.S. Pat. Nos. 4,611,094 and 4,611,096, both to ASMUTH et al., disclose a system for providing custom incoming telephone call processing services to a subscriber operating at many geographically diverse locations. A subscriber program stored in a central database is accessed to provide instructions to the SSPs to complete incoming calls to one of the subscriber locations in accordance with special services defined by the subscriber. The subscriber program controls the Action Control points (ACP) to string together the desired call processing capabilities to process each call. Specified parameters stored in the program, such as time of day, caller location and data inputted by the caller, determine the final destination to which each call should be completed.

U.S. Pat. No. 4,788,718, to McNABB, teaches centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers.

U.S. Pat. No. 4,757,267, to RISKIN, discloses routing of an "800-type" telephone call. The system identifies the caller's originating telephone number and initially routes the call to an office in the general vicinity of the caller. The office includes a vertical-horizontal (V-H) file listing dealers by product/service and equivalent latitude and longitude. The call is routed to the nearest dealer for the identified product or service based on a comparison of the called 800-number and the data in the V-H file. If the call cannot be completed to the nearest dealer, because the dealer's telephone is busy or the dealer does not answer, the call is routed to the next nearest dealer.

U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it to a database located at a centralized location, such as an SCP. Service features are controlled by the central database and are changed by reprogramming the service logic located at the central database. A variety of service features are provided including a work at home service that enables a user of a private network access from a home telephone and access authorization to increase the security of the private network.

While prior AIN or AIN-type intelligent network applications have provided call data recording features to subscribers and users, most of these attempts do not provide data on incoming calls for local exchange traffic. For example, the call data collection methods disclosed in RISKIN and McNABB et al. are limited to incoming calls to an "800-type" number. Past attempts also fail to provide subscribers with the ability to select among different report packages, including reports which provide aggregate call related information based on the quantity of calls by Zip Code+4 and demographic code. In contrast to prior attempts, such as that disclosed in KAY et al., the present invention can provide subscribers with summary call data related to total number of calls, total number of calls by day of the month, total number of calls by hour of the day, total number of calls by NPA-NXX, total number of calls by demographic code, and/or total number of calls by Zip Code+4.

Such features are desirable to subscribers and users, such as advertising media companies and business, that wish to determine the effectiveness of various promotional campaigns and/or obtain market data about their clientele, relative to their location, demographics and when the calls are placed. In particular, businesses such as telephone directory providers, television and radio stations, billboard owners and direct mail providers could benefit from such features, as provided through one or more aspects of the present invention.

OBJECTS OF THE PRESENT INVENTION

In view of the above, the present invention, through one or more of its various aspects and/or embodiments, is thus presented to accomplish one or more objectives and advantages, such as those noted below.

A general objective of the present invention is to provide a flexible call reporting application for use with an Advanced Intelligent Network (AIN).

It is a further objective of the present invention to provide subscribers with report packages, configured to their specifications, that include aggregate incoming telephone call information.

Another objective of the present invention is to provide data on incoming telephone calls for local exchange traffic.

Still another objective of the present invention is to provide call information according to a plurality of selectable report packages, including total quantity of calls, quantity of calls by date, quantity of calls by hour, quantity of calls by NPA-NXX, quantity of calls by Zip Code+4, and quantity of calls by demographic code.

Yet another objective of the present invention is to record call related data, through use of an Advanced Intelligent Network (AIN), according to quantity of calls by Zip Code+4.

Still another objective of the present invention is to record, through use of an Advanced Intelligent Network (AIN), call related data and provide a report of aggregate phone calls according to a demographic code.

It is still a further objective of the present invention to provide subscribers with call reports in a media format, e.g., disk or paper, desired by the subscriber.

The above-listed and other objectives, features and advantages of the present invention are more fully set forth hereinafter.

SUMMARY OF THE PRESENT INVENTION

Accordingly, one aspect of the present invention is to provide a method for producing a record of calls to a subscriber in an advanced intelligent network. The advanced intelligent network may include a two-way communication network interconnecting a plurality of service switching points and a plurality of dispersed network locations. The service switching points may selectively establish a communication connection between at least two of the network locations in response to a call request from a calling party, and a service control point may include a call processing record including service logic to initiate recording of incoming call data in response to a call request from a calling party to establish communication with the subscriber. The method may include collecting and recording call data at the service control point in response to the call request from the calling party to establish communication with the subscriber, the call data may include an originating number of the calling party and a terminating number of the subscriber, accumulating and storing the call data according to a plurality of selectable report formats, the plurality of selectable report formats being enabled by service enabling data and including a total number of calls based on a demographic code associated with the calling party, and thereafter, periodically producing a caller data service report based on the call data accumulated and stored according to the plurality of selectable report formats.

According to another aspect of the present invention, the plurality of selectable report formats may further include one or more of a total number of calls, a total number of calls by day of month, a total number of calls by hour of day, a total number of calls by local exchange, and a total number of calls by Zip Code+4.

According to another aspect of the present invention, the method may further include determining whether the service enabling data enables reporting a total number of calls by Zip Code+4, accessing a network user database based on the originating number of the calling party, the network user database may include a Zip Code+4 associated with the calling party, reading the Zip Code+4 associated with the calling party, calculating a total number of calls to the terminating number of the subscriber by Zip Code+4, and recording the total number of calls.

According to a further aspect of the present invention, the method may further include determining whether the service enabling data enables reporting a total number of calls by demographic code, accessing network user database based on the originating number of the calling party, the network user database may include a demographic code associated with the calling party, reading the demographic code associated with the calling party, calculating a total number of calls to the terminating number of the subscriber by demographic code, recording the total number of calls.

According to another aspect of the present invention the method may further include transferring the call data that is collected and recorded at the service control point to a remote processing unit, the call data being accumulated and stored according to the plurality of selectable report formats at the remote processing unit.

According to yet another aspect of the present invention the step of accumulating and storing the call data may include recording daily call data associated with service requests to establish communication with the subscriber, combining the recorded daily call data with previously recorded daily call data on a weekly basis, and storing the combined daily call data as a composite weekly call data file.

According to still another aspect of the present invention, the method may further include identifying a current month, collecting all of the daily call data for a month immediately preceding the current month, identifying the terminating number of the subscriber within the call data, and recording the monthly call data associated with the terminating number identified.

According to yet another aspect of the present invention the step of collecting the call data may further include combining the six most recent weekly call data files, removing from the combined call data files any call data related to the current month, removing from the combined call data files any call data related to two months previous, leaving only call data related to the previous month remaining, and recombining and recording the remaining call data.

According to still another aspect of the present invention, the collecting and recording of the call data may include collecting and recording local exchange traffic.

Accordingly, it is another aspect of the present invention to provide an apparatus for producing a record of calls to a subscriber in an advanced intelligent network. The advanced intelligent network may include a two-way communication network interconnecting a plurality of service switching points and a plurality of dispersed network locations. The service switching points selectively establish a communication connection between at least two of the network locations in response to a call request from a calling party, and a service control point may include a call processing record including service logic to initiate recording of incoming call data in response to a call request from a calling party to establish communication with the subscriber. The apparatus may include a device for collecting and recording call data at the service control point in response to the call request from the calling party to establish communication with the subscriber, the call data may include an originating number of the calling party and a terminating number of the subscriber, a device for accumulating and storing the call data according to a plurality of selectable report formats, the plurality of selectable report formats being enabled by service enabling data and including a total number of calls based on a demographic code associated with the calling party, and a device for producing a caller data service report based on the call data accumulated and stored according to the plurality of selectable report formats.

According to another aspect of the present invention, the plurality of selectable report formats further may include one or more of a total number of calls, a total number of calls by day of month, a total number of calls by hour of day, a total number of calls by local exchange, and a total number of calls by Zip Code+4.

According to yet another aspect of the present invention, the apparatus may further include a device for determining whether the service enabling data enables reporting a total number of calls by Zip Code+4, a device for accessing a network user database based on the originating number of the calling party, the network user database may include a Zip Code+4 associated with the calling party, a device for reading the Zip Code+4 associated with the calling party, a device for calculating a total number of calls to the terminating number of the subscriber by Zip Code+4, and a device for recording the total number of calls.

According to a further aspect of the present invention, the apparatus may further include a device for determining whether the service enabling data enables reporting a total number of calls by demographic code, a device for accessing the network user database based on the originating number of the calling party, the network user database may include a demographic code associated with the calling party, a device for reading the demographic code associated with the calling party, a device for calculating a total number of calls to the terminating number of the subscriber by demographic code, a device for recording the total number of calls.

According to yet another aspect of the present invention, the apparatus may further include a device for transferring the call data that is collected and recorded at the service control point to a remote processing unit, the call data being accumulated and stored according to the plurality of selectable report formats at the remote processing unit.

According to still another aspect of the present invention, the device for accumulating and storing the call data may include a device for recording daily call data associated with service requests to establish communication with the subscriber, a device for combining the recorded daily call data with previously recorded daily call on a weekly basis, and a device for storing the combined daily call data as a composite weekly call data file.

According to another aspect of the present invention, the apparatus further may include a device for identifying a current month, a device for collecting all of the daily call data for a month immediately preceding the current month, a device for identifying the terminating number of the subscriber within the call data, and a device for recording the monthly call data associated with the terminating number identified.

According to still another aspect of the present invention, the step of collecting the call data may include a device for combining the six most recent weekly call data files, a device for removing from the combined call data files any call data related to the current month, a device for removing from the combined call data files any call data related to two months previous, leaving only call data related to the previous month remaining, and a device for recombining and recording the remaining call data.

According to a further aspect of the present invention, the device for collecting and recording of said call data includes a device for collecting and recording local exchange traffic.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIGS. 6A and 6B show an example of a paper printout of a subscriber call report, according to the present invention;

FIGS. 7A and 7B show an example of a format for a diskette storing a subscriber caller data service report, according to the present invention;

FIG. 8 shows a spreadsheet printout of the subscriber caller data service report stored on the diskette of FIGS. 7A and 7B.

DETAILED DESCRIPTION OF PREFERRED EMBODIMENTS

Many telephone services may be provided using an AIN or AIN-type network for centralized control of telephone services offered to subscribers, as opposed to localized control of services at the Central Office (CO). The AIN system is provided through interaction between switching points and other systems supporting AIN logic.

The subscriber caller data recording features of the present invention may be implemented using advanced intelligent network capabilities which are provided by telephone company programmable service control points (SCPs), central offices equipped with AIN service switching point (SSP) features, and existing Common Channel Interoffice Signaling (CCIS) networks, or preferably Common Channel Signaling (CCS) networks. The Signalling System 7 (SS7) network is a widely used CCS network that provides two-way communication of Transaction Capabilities Application protocol (TCAP) formatted data messages between the SCP and the STP. The telephone network essentially employs an upper-level software network through the STPs and the SCP. The software resides over the hardware to check the call route and the availability of connection prior to hardware connection.

Figure 1:
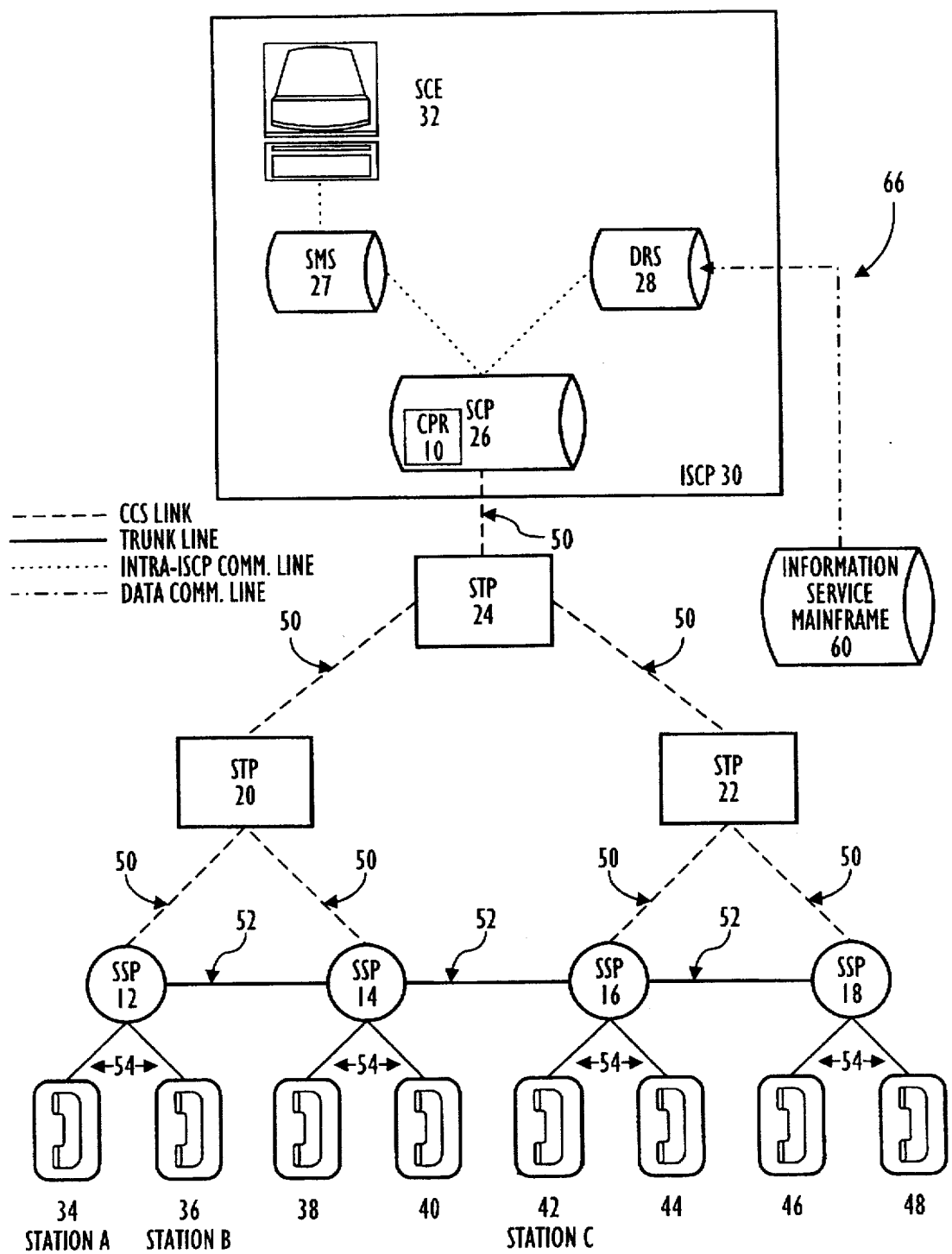
FIG. 1 illustrates, in a general block diagram form, an Advanced Intelligent Network (AIN) system for implementing the subscriber caller data recording features of the present invention.

Referring now to the accompanying drawings, FIG. 1 illustrates a general block diagram of an Advanced Intelligent Network (AIN) in which an apparatus and method for recording call related data is embodied in accordance with the present invention. In FIG. 1, local telephone lines 54 connect individual network locations 34-48 in each geographic area to the closest Central Office (CO). Each CO is shown in FIG. 1 as a Service Switching point (SSP) 12, 14, 16 and 18. The SSPs may include, but are not limited to, 5ESS, 1AESS, and DMS-100 switches. If 5ESS switches are utilized, then these switches may be equipped with Generic 5E8 (or higher) and provided the necessary trigger requirements (discussed below) in order to serve subscribers. Any 1AESS switches may be equipped with Generic 1AE12.01 (or higher) and provided the necessary trigger requirements in order to serve subscribers. For DMS switches, BCS-35 or BCS-36 and the necessary trigger features can be provided.

For purposes of illustration, only four SSPs are shown in FIG. 1. However, more (or less) than four SSPs may be utilized. The SSPs 12, 14, 16 and 18 are programmable switches which: recognize AIN-type calls; launch queries to an Integrated Service Control point (ISCP) 30; and, receive commands and data from the ISCP 30 to further process and route AIN-type calls. When one of the SSPs 12, 14, 16 and 18 is triggered by an AIN-type call, the SSP 12, 14, 16 and 18 formulates an AIN service request and responds to call processing instructions from the network element in which the AIN service logic resides. The AIN service logic may reside in a database at the Service Control point (SCP) 26. The SSPs 12, 14, 16 and 18 are connected by trunked communication lines 52 which are used to connect and carry telecommunication signals, e.g., voice and/or data, from a calling party to a called party.

In FIG. 1, the SSPs 12, 14, 16 and 18 are equipped with Common Channel Signaling (CCS) capabilities, which provide for two-way communications of data messages between each SSP 12, 14 16 and 18 and the ISCP 30 via CCS links 50. The data messages are formatted in accordance with the Transaction Capabilities Applications protocol (TCAP). As shown in FIG. 1, SSPs 12 and 14 are connected to a first local area Signal Transfer point (STP) 20 by CCS links 50. SSPs 16 and 18 are connected by CCS links 50 to a second local area STP 22. The connections 50 to the STPs are for signaling purposes, and allow the SSPs to send and receive messages to and from the ISCP 30. Each of the STPs can be connected to a large number of other STPs. For purposes of illustration in FIG. 1, CCS links 50 connect local STPs 20 and 22 to a regional STP 24 and connect the regional STP 24 to the ISCP 30.

The ISCP 30 is an integrated system which includes a Service Management System (SMS) 27, a Data and Reports System (DRS) 28, a programmable Service Control point (SCP) 26, and a Service Creation Environment (SCE) 32. The SCE 32 is a terminal that may be provided for programming the database in the SCP 26. The SCP 26 executes software-based service logic and returns call routing instructions to the SSPs. The SMS 27 and the DRS 28 may be provided for compiling calling information to be used for billing and administrative purposes. By way of example, the ISCP 30 may implemented with the Bellcore Integrated Service Control point (ISCP), loaded with ISCP software Version 2.2, available from Bell Telephone Laboratories, Inc., Murray Hill, New Jersey. The DRS 28 may also be equipped with Version 2.2 software. Further, the SMS 27 may be provided as a separate system in the ISCP or the ISCP may contain service management functionality or a service management environment implemented through software.

When a non-AIN phone call is initiated from, for example, party A at location 34 in FIG. 1, the call is directed to the central office SSP 12 serving the calling location 34. When the SSP 12 receives the originating call, the call is suspended and the software network takes over routing and connection of the call. Normal call processing begins when an originating station 34 is off-hook and the local SSP 12 receives dialed digits (the party B telephone number) from the originating station. The SSP 12 analyzes the digits and determines the call type, i.e., intraswitch or interswitch. An intraswitch call, i.e., local call, directly connects the calling station 34 with the called station 36 without any querying outside of the central office 12, which serves both stations.

When the called station, for example, party C at station 42, is not served by the same central office as originating party A, further processing may be necessary. In this situation, the originating call from party A is suspended at the central office by SSP 12, which further sends a signaling message through one or more of the local STPs 20, 22 and/or regional STP 24 to offer termination of the call. The signaling message is routed to terminating SSP 16, located in the central office serving location 42 of the called party C. If station 42 is off-hook, i.e., busy, terminating SSP 16 responds to the query of SSP 12 that the call cannot be connected, and a busy signal is transmitted to the calling party A. If station C is on-hook, SSP 16 responds to the query of originating SSP 12 by transmitting a ringback signal to calling party A, which is then serially connected through the trunked communication lines 52 to called location 42, i.e., from SSP 12 to SSP 14, from SSP 14 to SSP 16, and from SSP 16 to called party C.

Advanced Intelligent Network (AIN) call processing differs from standard telephone call processing in that a query into a centralized database, e.g., ISCP 30, is triggered by an AIN application. In AIN-type call processing, an SSP is responsible for identifying calls associated with AIN services, detecting when conditions for AIN service involvement are met, formulating service requests for call processing instructions, and responding to the instructions received. As with normal call processing, when the call is suspended at the calling party's SSP, the SSP of the originating call may send a data message, via the CCS links 50, to the STPs to establish the call route. Advanced Intelligent Network (AIN) services are created by assigning appropriate SSP call suspension points, known as AIN "triggers", accessed via customer lines or telephone numbers, and accessing customer or service-specific logic in the ISCP 30. Ideally, AIN service should be triggered at the earliest possible point in the call, i.e., at the originating SSP; however, service providers may only be able to provision the network with AIN triggers residing in the COs serving the subscribing customer. Thus, if an originating call to SSP 12 is an AIN trigger, i.e., a call requiring AIN service involvement, the SSP 12 suspends the call, then queries the ISCP 30 through the STPs 20 and 24 through the CCS links 50.

For purposes of illustration, assuming that originating party A (a non-AIN subscriber) offers connection to party C (an AIN subscriber), the ideal location for triggering AIN is when the call is initially suspended at SSP 12, as discussed above. However, if the AIN trigger is available only at the SSP 16 serving AIN subscriber C at location 42, the originating SSP 12 will establish a communication path to the terminating SSP 16 via SS7 messaging through STPs 20, 24, and 22. When SSP 16 detects a terminating trigger, for example, on the line or telephone number called, SSP 16 will launch a query to the SCP 26, for example, within the ISCP 30, through STPs 22 and 24. The query may be in TCAP format and identify the calling station (calling station A) and the dialed digits (the number of AIN subscriber at station C).

Upon receipt of the query message from the SSP 16, the SCP 26 executes software based service logic programs based on the query message to perform subscriber functions, e.g., subscriber caller data recording. Service Control point 26 will transmit a response to the SSP 16 query with further call processing instructions, e.g., input data, route the call, etc. Assuming the SCP 26 response to include call processing instructions to route the call, SSP 16 will terminate the offered telephone call to location 42. The AIN service application may be stored in an ISCP database, e.g., the SCP 26, and accessed by a predetermined SSP trigger.

Central offices equipped as AIN SSPs allow normal switch call processing to be suspended at specific points in a telephone call, enabling TCAP formatted query and response messages to be transmitted between the SSP and ISCP. Advanced Intelligent Network queries will be routed from a central office (CO) or switching service point (SSP) to a local STP using existing CCS links. These queries will then be routed from the local STP to the regional STP, and from the regional STP to the ISCP.

As noted above, new services may be created by assigning appropriate SSP AIN triggers to customer lines or telephone numbers to access customer and/or service-specific logic in the ISCP. The subscriber caller data reporting feature of the present invention, using the AIN Release 0.0 protocol, may be provisioned through a 3/6/10 digit SSP trigger if the SSP is implemented with either a 5ESS or a DMS-100 switch, and via a Dialed Number trigger for SSPs that include a 1AESS switch. The ten digit trigger, for 5ESS or DMS-100 switches, in accordance with the subscriber caller data reporting feature of the present invention, may be established based on the subscriber's telephone number. However, for systems using AIN Release 0.1 protocols, triggers may be provisioned through a Terminating Attempt Trigger (TAT), which may perform better, in most cases, than the 10 digit triggers. Because the 3/6/10 digit trigger is office based, it may be possible to establish a trigger in every AIN equipped switch, thus generating the query at the first point of switching (tandem or originating end office). However, for initial implementations of subscriber caller data reporting, the 3/6/10 digit trigger may be established in the switching office that serves the specific subscriber's telephone number. The TAT is most appropriately situated in the switching office that serves the specific subscriber's telephone number or location.

Because the TAT and the 3/6/10 digit trigger may be based within the SSP serving the subscriber's telephone number, the trigger will actuate AIN queries or functionality even on a local telephone call. That is, an AIN triggered call may be conceptualized as having two "legs". The first leg is created between the originating office and the SSP that serves the triggering number. The second leg is created between the triggering number and the final destination. This concept applies even if the call originates in the SSP that serves as the trigger (a local call), because while the first leg is intraswitch, it is still considered a call leg from a billing standpoint. The first leg may be recorded at the originating office using normal POTS recording translations, and the second leg may be recorded at the SSP. If the call originates at the SSP, both records may be generated from the SSP. Therefore, the ISCP cannot influence recording for the first leg.

Once the trigger has been established and activated, every incoming call to a service subscriber will generate an AIN TCAP message from the triggering switch to the ISCP. Thus, once the subscriber caller data service has been activated, incoming calls to the subscriber's telephone number cause the SSP serving the subscriber to trigger an SS7 query to the ISCP. The ISCP will receive and process a query based upon service logic, which may reside in the SCP 26 as a Call processing Record (CPR) 10. Based on the triggered service logic, the ISCP will collect statistics on the call, and ultimately return a routing number or trunk group number to the originating SSP. The originating SSP will then terminate the call as directed.

Activation of subscriber caller data will cause the SSP to trigger a query to the ISCP on every call to the subscriber's number. There may be no restrictions on incoming calls, which can be line or trunk terminated, intra- or inter-LATA, etc. In the 5ESS and 1AESS switches, the customer's telephone number may be associated with line equipment so that the ISCP may route calls to the terminating telephone number after the ISCP query. For systems using the AIN Release 0.0 protocol, ISCP messages that direct the a DMS-100 SSP to route to the dialed number are not allowed. Service will thus be limited in the DMS-100 switches to numbers that do not have line assignments, such as Direct Inward Dialing (DID) numbers. However, this limitation will not exist under AIN Release 0.1 protocol.

Once the subscriber's number becomes a trigger for the subscriber caller data recording service, every incoming telephone call to the subscriber will trigger caller data collecting services to query an AIN message from the subscriber's SSP to the ISCP 30. When the ISCP 30 receives the query, the subscriber caller data service logic will be executed. Call data will be collected and recorded in the Data Recording System (DRS) 28, as per the normal ISCP SAMPLE node operation, i.e., the ISCP 30 contains resident software (e.g., ISCP software Version 2.2) that collects the calling number, the called number, the date, and the time of each query to the ISCP 30. The ISCP 30 will then return control of the call, via a routing number, to the suspending SSP for termination. The routing number for this service will generally be the telephone number originally dialed by the calling party to the subscriber, and used by the SSP to complete the call as dialed.

Once the necessary service logic has been completed, control of the originating call may be returned to the triggering SSP. To complete the originating phone call, the ISCP service logic for this service must respond to the SSP query with one of two possible responses. The call may be routed to a directory number, i.e., the dialed number, in which the appropriate number must be returned in a routing number parameter in a TCAP connect message, or, alternatively, routed to a trunk group number as required by DMS-100 switches to route calls to DID facilities. The trunk group is returned in the primary trunk group parameter of the TCAP connect message. In the alternative case, the ISCP service logic must have detailed knowledge of trunk group identifiers, office route numbers, and individual SSPs in order to create service for a customer. This information may be obtained during a service order process and may require that translation groups be consulted in order to complete such supplemental service order/provisioning information.

After the data has been collected and stored in the DRS 28, the data may be compiled and prepared for transmission, in accordance with a File Transport protocol (FTP) on a Transmission Control protocol/Internet protocol (TCP/IP), over a communication line 66 to an Information Service Mainframe 60. The communication line 66 may comprise an analog telephone line, RS-232 line, or any other serial transmission line. The Information Service Mainframe 60 may comprise an IBM MVS Mainframe and be provided to sort the stored data files and prepare subscriber caller data reports on a periodic basis (e.g., a weekly or monthly basis). The prepared reports may then be sent to subscribers via an appropriate media, e.g., paper or computer diskette.

In accordance with an aspect of the present invention, subscriber caller data reports may be generated to provide subscribers with a reports package that summarizes incoming phone calls into one or more of the at least six separate categories, including: total number of calls; total number of calls by day of the month; total number of calls by hour of the day; total number of calls by originating area code and exchange (i.e., NPA-NXX); total number of calls by Zip Code+4; and total number of calls by demographic code. Subscribers can order any combination or all of these categories to be provided in their subscriber caller data reports. The reports may provide summary data, e.g., total calls per month for each category, which gives the subscriber a general overview of the telephone traffic coming into their telephone number(s). Subscribers, such as advertising media companies and other businesses, may use these reports to monitor their business by analyzing the data to determine the effectiveness of a marketing strategy linked to a customer response telephone number, and therefore determine the effectiveness of various promotional campaigns and obtain market data about clientele relative to geographic location, demographic position, and call placement time.

The present invention is not limited in the number of services categories that may be offered or in the data that may be collected. Thus, if desired, an additional category may be provided in the call data report indicating the number of calls made from a particular telephone number, the time that the calls were placed, etc. However, because certain individuals may not wish to have their telephone numbers released to telemarketers, solicitors, etc., the present invention may include a presentation (or privacy) indicator which causes the calling party's telephone number not to be listed on the call data reports and/or indicated as being "private." Such a privacy indicator may be based on existing services for blocking the calling party's telephone number (e.g., services that prevent release of the Automatic Number Identification information based on entry of predetermined digits along with the dialed number). For example, if a call is placed from a calling party who wishes to keep his telephone number private or anonymous, additional digits (indicating a private number) may collected with the calling party's telephone number to alert the downstream facility that the private number is not be printed or released in the call data report. In such a case, service software for compiling the call data may assign a default number or character to indicate that calls have been received from a private number. For instance, an asterisk or "private" message may be printed on the call data report in place of the private number.

As shown in FIG. 1, the subscriber caller data reporting features of the present invention includes a downstream system (e.g., Information Service Mainframe 60) that may be external from the ISCP 30 and provided in order to generate the necessary subscriber reports. Although most available DRS systems have their own report generation capabilities, such systems are incapable of facilitating all of the features of the present invention. In particular, known DRS systems do not contain the necessary Zip Code+4 and demographic code information that may be provided by the present invention. Thus, an external system, such as the Information Service Mainframe 60, may be required.

The application service logic of the present invention allows customers to specify any combination of up to six categories/data elements to be contained in their subscriber caller data reports. These categories, however, are not administered by service logic within the ISCP 30. The ISCP 30, via the SAMPLE node, will collect the necessary call data, i.e., originating telephone number, dialed telephone number, time, and date, and store this data in the DRS 28. The DRS 28, in turn, will format the data and transmit it to a downstream system (e.g., Information Service Mainframe 60) for further processing. The downstream system may include stored customer files to determine which of the six categories/data elements have been specified by the subscriber. Based on the data in the customer files, the downstream system will further process the ISCP call data according to one or more of the six categories and generate the subscriber report. The report may then be provided to the subscriber in a predefined form, i.e., paper or computer diskette, or available in electronic form, e.g., by modem.

According to the present invention, the ISCP 30 requires no additional system hardware or software, such as reading or screening tables, for the subscriber caller data service to be implemented. The Call processing Record (CPR) 10 employed by the present invention may consist of an input for the subscriber's telephone number (e.g., the TAT or 3/6/10 digit trigger), and an input for a routing number or a trunk group identifiers (e.g., for routing the calls of subscribers serviced by DMS-100 switches). However, if subscriber caller data reports are requested by a customer who also has another AIN based service, more complex customer service logic may be required and the subscriber caller data call processing record may no longer be used to provision the service.

Under normal conditions, subscriber caller data requires only one TCAP query/response message pair. These messages consist of a query message from the triggered SSP to the ISCP 30, and a response message from the ISCP to the SSP. The response message will have a component directing the call to be routed to the dialed number or a trunk group number.

In addition to the TCAP query/response messages, error messages may be exchanged between the querying SSP and the responding ISCP 30 when application, protocol, and/or other errors are detected. Error messages are generally unidirectional, and can be sent from the SSP to the ISCP 30, or from the ISCP to the SSP, as conditions warrant.

In the event of system error, error messages will be also be transmitted between the SSP and the ISCP 30, via CCS links 50, if protocol, application, or other errors are detected. In general, errors can be classified as non-fatal, i.e., call processing continues, or fatal, i.e., call processing is terminated. When the SSP detects a non-fatal error condition, the error message is transmitted from the SSP to the ISCP 30. When the ISCP 30 receives an error message, appropriate action is taken to correct the condition, i.e., various administrative actions.

Two types of error messages are applicable when fatal errors are detected. If the fatal error involves a condition within the service application, a return error message is transmitted. If the fatal error involves a condition of the existing protocol, a reject message is transmitted. Both the SSP and the ISCP 30 may send this message, depending upon where the fatal application or protocol error is detected. Since the subscriber caller data features of the present invention may use office-based TAT or 3/6/10 digit AIN triggers, there are no unique requirements for access by callers that are served by non-SSP offices. The subscriber's number (and hence the 3/6/10 digit trigger) can be accessed by any caller, from any switch, by simply dialing the subscriber's telephone number. However, the subscriber caller data service cannot be established for a subscriber's existing telephone number if the customer's serving central office SSP has not been equipped with AIN capabilities, and it may not be possible to retrieve information, such as the calling number.

Subscriber Caller Data Reporting

Figure 2:
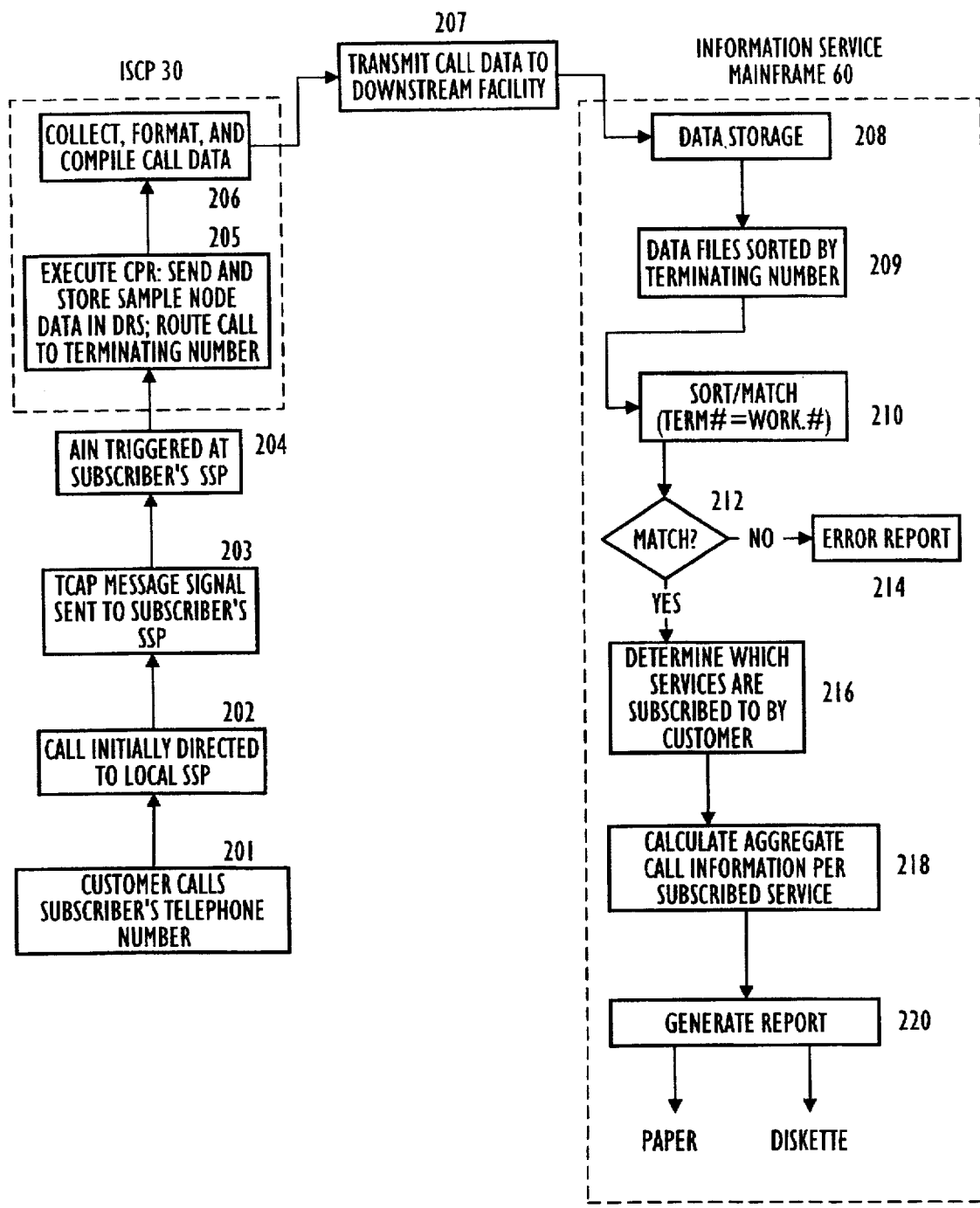
FIG. 2 shows a block diagram of the general operation of the subscriber caller data features of the present invention.

Referring now to FIG. 2, a block diagram representation is provided of the subscriber caller data recording features of the present invention. The block diagram of FIG. 2 shows the overall logic flow of the present invention, as well as the physical location (e.g., the ISCP 30 or the Information Service Mainframe 60) where several of the logic steps are performed.

As shown at step 201 in FIG. 2, the subscriber caller data recording service is initiated by a calling party dialing the telephone number of the subscriber. The calling party may place the call request from any of the network locations 34-48 shown in FIG. 1. In response to the call or service request, the call, at step 202, is initially directed to the local SSP serving the calling party. A TCAP format messaging signal is sent to the subscriber's local SSP at step 203. The TCAP message from the calling party's SSP may be transmitted to the subscriber's SSP through CCS links 50 and one or more of the STPs 20-24 as needed. After the TCAP messaging signal is received by the subscriber's SSP, the AIN trigger is recognized at step 204 based on the TCAP message. The SSP then transmits a query message to the ISCP 30 at step 205 so that the CPR 10 associated with the subscriber caller data reporting service may be accessed. The query message that is sent to the ISCP 30 may be formatted in accordance with TCAP and include the originating number (the calling party's telephone number) and the dialed digits (the subscriber's telephone number). As noted above, the ISCP 30 may contain resident software (e.g., ISCP software Version 2.2) that collects the calling number, the called number, the date, and the time of each query to the ISCP 30. Accordingly, at step 205, upon receipt of the query message from the SSP, a normal ISCP SAMPLE node operation may be performed at the ISCP 30 to collect the call related data.

At step 206, the accessed CPR 10 causes the collected data to be sent to and stored in a predetermined file location in the DRS 28. In addition, the service logic of the CPR 10 may assign carrier and billing information (if required) and a routing number (e.g., the called number) for routing of the call to the subscriber's network location. In such a case, the ISCP 30 will generate a response message that is sent to the SSPs for routing and termination of the call.

As illustrated in FIG. 2, after the DRS 28 has collected the call related data, the DRS at step 207 may prepare the data for transmission (e.g., by formatting, compiling, etc.) and transmit the data in accordance with a File Transport protocol (FTP) on a Transmission Control protocol/Internet protocol (TCP/IP) over a communication line 66 to a downstream facility (e.g., the Information Service Mainframe 60). At step 208, the transmitted data may be stored in a data file of the Information Service Mainframe 60. The data file may be stored in a database (not shown) of the Information Service Mainframe 60 and will vary each time it is created. The size of the data file to be stored will be dependent upon the number of subscribers and the number of calls per day. Depending on the number of subscribers and calls per day, it may be more advantageous to transmit the data on a daily basis as opposed to a weekly or monthly basis. At step 209, the Information Service Mainframe 60 may sort and group the stored data files according to the terminating number (i.e., the dialed subscriber's telephone number).

In accordance with an aspect of the present invention, the Information Service Mainframe 60 may also include customer format files that are stored in a database. The customer format files include the subscriber's working telephone number, which is the number assigned to trigger the service, and other customer information such as the subscriber's name, address and specified reporting categories and format. The customer format files may be sorted and grouped numerically according to the subscribers'working telephone numbers.

At step 210, the Information Service Mainframe 60 may perform a sorting routine for sorting and matching (if possible) the working number of each customer format file with a corresponding terminating number of the data files grouped at step 209. In order to identify a match, a look-up table (not shown) stored at the Mainframe 60 may be employed. The Information Service Mainframe 60 then determines at step 212 whether each grouped data file has a corresponding format file. If a grouped data file is found without a matching format file, and an error report may be generated at step 214. The Information Service Mainframe 60 may also generate an error or exception report if an existing format file can not be matched with any of the grouped data files to indicate a possible system error.

In accordance with an aspect of the present invention, one of two exception reports may be created at step 214. These exception reports may be cumulative and used by service personnel to find and correct system errors. For example, if a grouped data file is found without a matching format file, an exception report entitled, e.g., Usage Records Without Associated Subscriber Caller Data Accounts, may be produced. The report may list all occurrences of data files being found without a matching customer account. The report may be formatted, for example, in terminating telephone number order, and may show the range of dates and the total calls on the usage file for the terminating number. In addition, a second type of exception report entitled, e.g., Subscriber Caller Data Accounts Without Associated Records, may be produced if an existing customer format file is found without a grouped data file. The report may be formatted, for example, in working telephone number order and may also include the billing telephone number, the options to which the customer subscribes, the requested media and customer mailing address.

If the Information Service Mainframe 60 determines at step 212 that a grouped data file is associated with a format file, then processing continues to step 216 in order to determine which services the subscriber has selected to receive in the subscriber's report. At step 216, the Information Service Mainframe 60 may access the customer format file associated with the subscriber and the customer information including the specified reporting categories therein. Based on the specified reporting categories in the subscriber's format file, the Information Service Mainframe 60 may calculate at step 218 the aggregate call information for each specified category. For example, if the subscriber specified the categories of total number of calls by Zip Code +4 and total number of calls for the reporting period (e.g., for a one month period), then these amounts would be calculated by the Mainframe 60 at step 218 based on the data in the subscriber's grouped data files. Thereafter, at step 220, the Information Service Mainframe 60 will generate the subscriber's caller data report. The caller data report may then be provided to the subscriber by directly mailing a copy of the report on paper or diskette, or by providing the report by other suitable means.

As discussed above, the subscriber caller data reporting features of the present invention includes a downstream system (e.g., Information Service Mainframe 60) that may be external from the ISCP 30 and provided in order to generate the necessary subscriber reports. Although most available DRS systems have their own report generation capabilities, such systems are incapable of facilitating all of the features of the present invention. In particular, known DRS systems do not contain the necessary Zip Code+4 and demographic code information that may be provided by the present invention. Thus, an external system, such as the Information Service Mainframe 60, may be required.

In accordance with an aspect of the present invention, the creation of the subscriber caller data reports may involve two main processes: (i) collecting, formatting, and transferring the call related data from the DRS 28 to the Information Service Mainframe 60 and (ii) compiling, processing, and assembling the transferred data at the Mainframe 60 into the subscriber reports. Each of the above-noted processes are discussed below reference to the accompanying drawings.

Collecting, Formatting, and Transferring Data

Figure 3A:
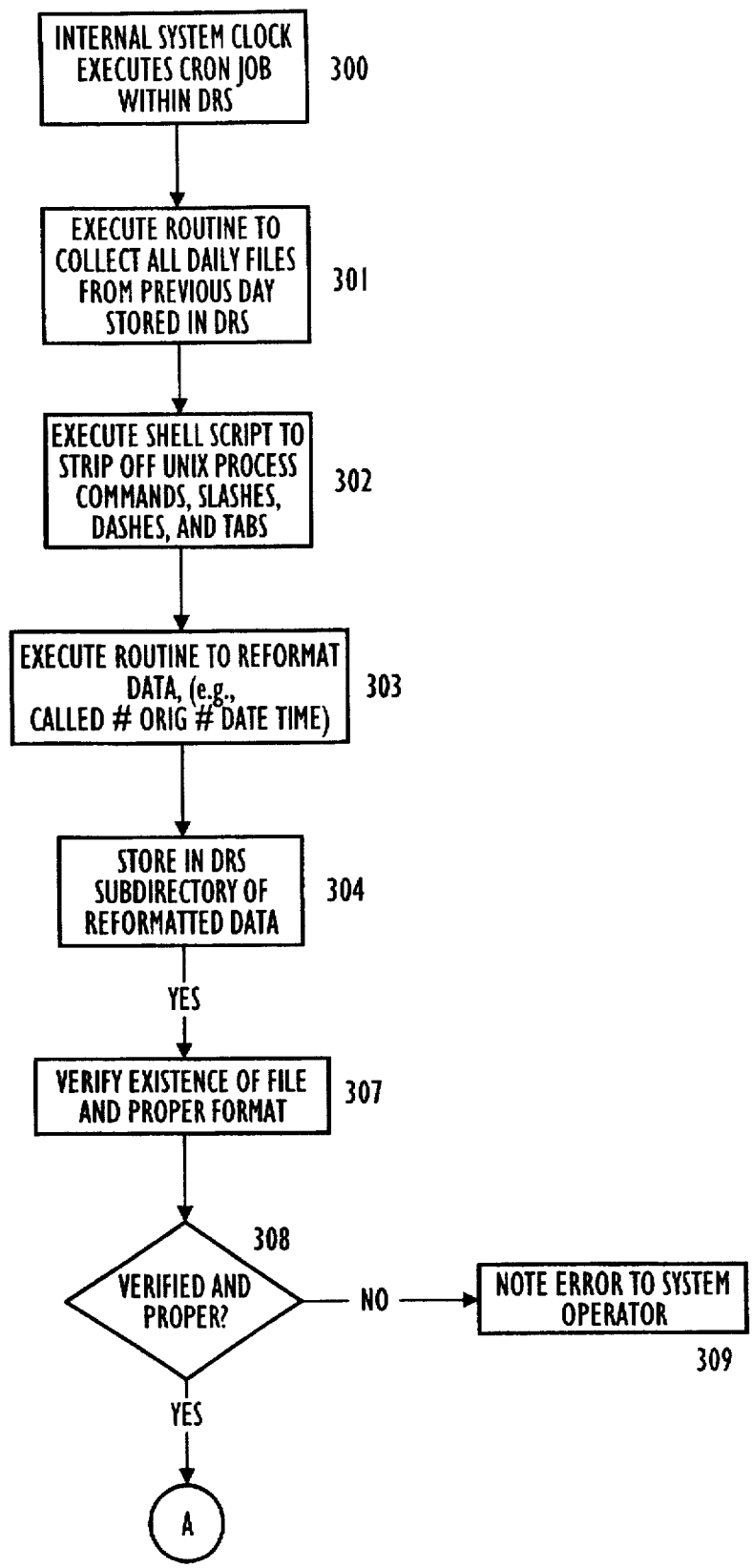
FIGS. 3A and 3B show a general flow diagram, in accordance with an aspect of the present invention, for recording call related data.
Figure 3B:
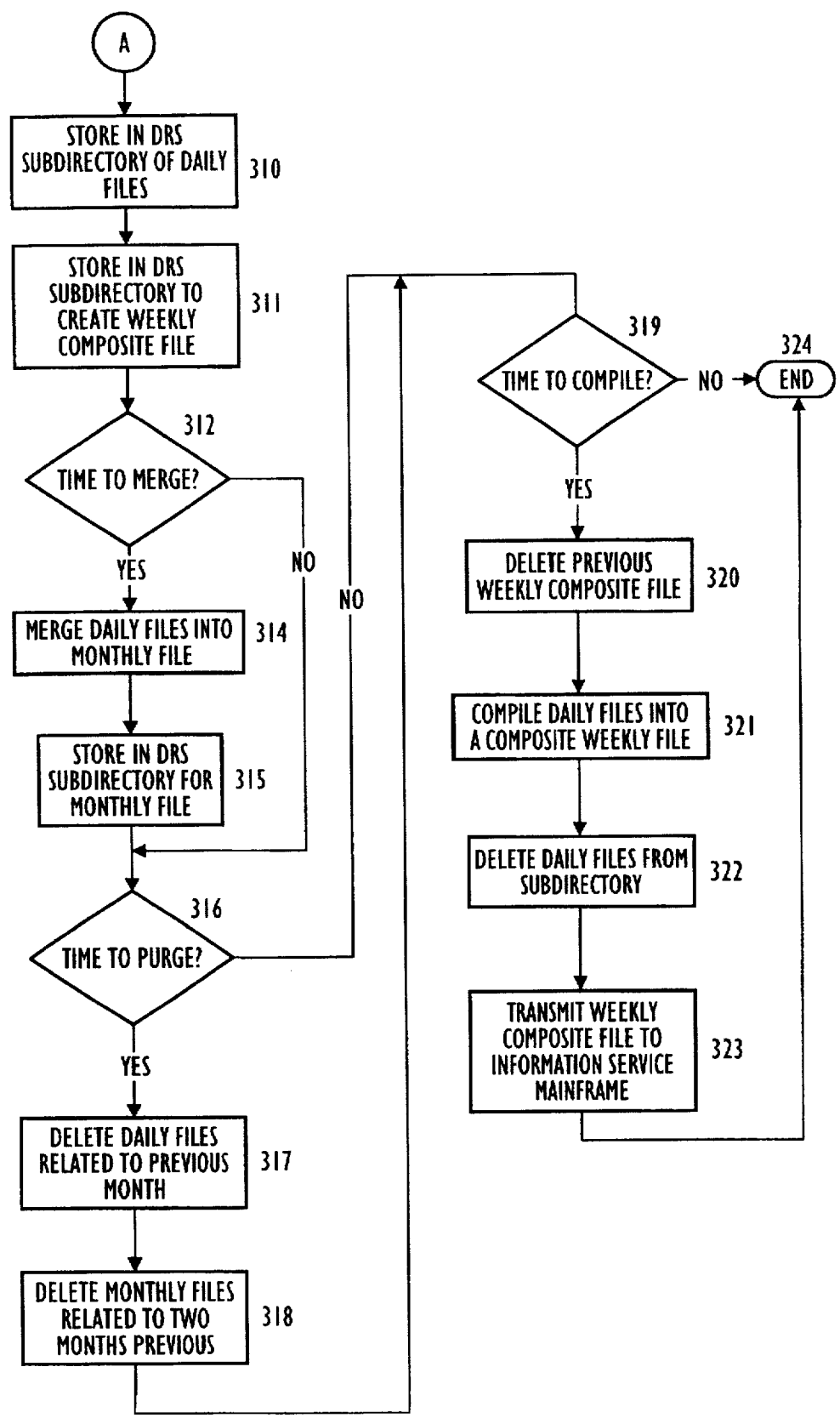

FIGS. 3A and 3B show a block diagram, in accordance with an aspect of the present invention, of the logic flow for collecting, formatting, and transferring the caller data at the DRS 28.

As shown in FIG. 3A, service logic in, for example, C programming language or UNIX shell script, is set up as a job at step 300 for chronological execution (i.e., a "cron job") at a predetermined time, that may be established by an internal system clock. The cron job may include a series of programs and scripts to format the data file for transmission to the downstream facility. The DRS may comprise a UNIX-based computer and SQL database, with the internal programs being written in C programming language or a UNIX shell script. At various predetermined times, the cron job may activate internal programs or routines of the DRS 28 (e.g., on a daily basis) in order to collect, format, and transfer the data in accordance with a predetermined run schedule.

The first internal program initiated, at step 301, collects a copy of the caller data stored at a predetermined file location in the DRS 28 and stores the copied data in a separate DRS subdirectory. The system designer may prefer to execute an additional program, e.g., a shell script program, to verify that the data copied from the predetermined location in DRS 28 to the DRS subdirectory is a correct copy. At step 302, further shell scripts and commands, e.g., "awk" and "sed" commands, may be executed to strip off any UNIX (or other system based) processing commands, tabs, slashes, and dashes in the data stored in the DRS subdirectory. The data remaining within the DRS subdirectory may then be reformatted at step 303 and stored in another DRS subdirectory for reformatted data at step 304. The reformatted data may consist of the called party's number, the calling party's number or Originating Station Directory Number (OSDN) and the date and time of the call. One example of a reformatted data entry may be: "2125551212 2125551213 06011995 15:34," which would correspond to a call placed to 212-555-1212 by a calling party at 212-555-1213 on Jun. 1, 1995 at 3:34 p.m.

At step 307, another verification routine may be executed after the reformatted data has been stored in the DRS subdirectory. This verification routine can be a shell script program, e.g., a sequence of "awk" commands and may be executed on a periodic basis (e.g., at the end of each day). The routine may verify the existence and proper reformatting of each stored file. At step 308, if the DRS 28 determines that a stored file does not exist, or if the DRS determines that a stored file is not properly reformatted, an error report or note may be made to service personnel at step 309 to indicate a possible system error. In such a case, any detected errors during the data validation may be logged in a file and sent to service personnel. The error log file may be maintained in the database of the DRS 28 and contain errors for only the most recent validation, with the log file being overwritten each time the verification routine is executed.

As shown in FIG. 3B, if the stored file's existence and proper reformatting has been verified at step 308, then a daily file may be stored in a DRS subdirectory created for storing daily files at step 310. A copy of the daily file may also be stored in a DRS subdirectory for creating weekly composite files at step 311. The daily files subdirectory of the DRS may store daily files for a predetermined number of preceding days (e.g., the last 31 or 62 days), and the weekly files subdirectory of the DRS may store weekly composite files for a predetermined number of preceding weeks (e.g., the last 4 or 8 weeks). The daily files may include the call data for each incoming call to the subscribers on the previous recording days, and the weekly composite file may include call data for each incoming call to the subscribers over the previous recording weeks.

At step 312, the DRS 28 determines whether it is time to merge the daily files stored within the daily file DRS subdirectory into a monthly composite file. The decision to merge the daily files into a monthly file may be based on the occurrence of a predetermined day and/or time of the month (e.g., the first day of each month at 1:00 a.m.). If the DRS 28 determines that it is not time to merge, then logic flow may proceed to step 316. However, if the DRS 28 determines that it is time to merge the daily files, then at step 314 a routine may be executed by the DRS in order to merge the daily files stored within the daily file subdirectory of the DRS into a monthly composite file. After the monthly composite file is formed, the DRS 28 at step 315 may store the file in a DRS subdirectory created for monthly files for the purposes of archiving the call data within the DRS for a predetermined period of time (e.g., two or three months). After step 315, logic flow continues at step 316.

In accordance with an aspect of the present invention, the daily and monthly files that are stored in the DRS 28 may be purged on a periodic basis in order to conserve memory space within the DRS database. Accordingly, at step 316, the DRS 28 may determine whether it is time to erase the daily and monthly files stored within the DRS. The decision to purge the daily and monthly files may be based on the occurrence of another predetermined day and/or time of the month (e.g., the second day of each month at 1:00 a.m.). If the DRS 28 determines that it is not time to purge the files, then logic flow may proceed to step 319. However, if the DRS 28 determines that it is time to purge the daily and monthly files, then at step 317 a routine may be executed by the DRS in order to erase the daily files which produced the most recent monthly file. At step 318, the DRS 28 may also delete the composite monthly files related to, for example, two months previous (e.g., if the report is being generated for the month of July, the composite monthly file for the month of May may be purged). After step 318, logic flow continues at step 319.

As shown in FIG. 3B, the DRS 28 may determine at step 319 whether it is time to purge the previous weekly composite file and merge the daily files into a new weekly composite file. The decision at step 319 may also be based on the occurrence of a predetermined day and/or time of the month (e.g., each Sunday at 5:00 a.m.). If the DRS 28 determines that it is not time to compile the new weekly composite file, then logic flow may proceed to step 324 to terminate the process. However, if the DRS 28 determines that it is time to compile the weekly composite file, then at step 320 a routine may be executed by the DRS in order to delete the previous weekly composite file stored within the weekly subdirectory of the DRS. At step 321, the DRS 28 may then execute a routine such that the daily files stored within the weekly subdirectory of the DRS be compiled into a composite weekly file and the new weekly composite file be stored within the weekly subdirectory of the DRS. Thereafter, the DRS 28 at step 322 may execute a routine in order to delete the daily files stored within the weekly subdirectory. The new weekly composite file may then be transmitted by the DRS 28, in accordance with FTp on TCP/IP, over communication line 66 to the Information Service Mainframe 60. After the weekly composite file has been transmitted at step 323, logic flow may proceed to step 324 in order to terminate the process.

The frequency and mode of transmission of the call data from the ISCP 30 to the Information Service Mainframe 60 may of course be varied depending on the capacity and requirements of the system. For example, although the embodiment of FIG. 3B discloses transmitting the call data on a weekly basis, frequency of the data transfer may be increased to a daily basis if the size of the daily files increases, e.g., due to the amount of subscriber related calls. As such, the DRS 28 may be provisioned with means (e.g., a system administrator) for monitoring the usage and growth of the call reporting service to determine if and when a conversion to a higher frequency of transmission is necessary.

Modes for transmitting the subscriber caller data files from the ISCP 30 to the Information Service Mainframe 60 may include disk exchange, dial-up modem, or a Wide Area Network (WAN). In addition, the ISCP 30 and DRS 28 of the present invention do not need to be located in close proximity to the Information Service Mainframe 60. In accordance with an aspect of the present invention, the DRS 28 may be located in a Company Network Operations Center (CNOC)-ISCP site that is removed from the downstream processing facility. For example, the CNOC-ISCP site may be located in Texas but the Information Service Mainframe 60 may be located in Missouri. Disk exchange may involve an individual at the CNOC-ISCP site manually inserting a computer disk into the server of the DRS 28 and recording the subscriber caller data files on the disk.

The disk may then be mailed to support personnel at the Information Service Mainframe 60, who could then download the files from the disk into the mainframe.

For a dial-up modem exchange, an agreed to schedule may be established so that the Information Service Mainframe 60 dials a modem on the server of the DRS 28 and establishes a connection at a predetermined time. The DRS 28 could then download the subscriber caller data files to the Mainframe 60 via the modem connection. While this mode of transmission is preferable to the disk exchange, certain security concerns may arise if the DRS modem is turned on continuously. If the modem is not on continuously, then it may be activated at predefined times by manual intervention at the CNOC-ISCP site. This method, however, may be best suited as a back-up method of data transfer.

The use of a WAN may be the most reliable data transfer method. The DRS 28, at the CNOC-ISCP site, could be placed on a Token Ring LAN, connected to the building LAN. The building LAN may provide access to a corporate WAN, though which the Information Service Mainframe 60 may communicate with the DRS 28 for the transfer of caller data output files.

In accordance with the present invention, two methods may be utilized to transmit data files over the WAN to the Information Service Mainframe 60. According to one method, the Information Service Mainframe 60 may execute a Transmission Control protocol/Internet protocol (TCP/IP) request to the DRS 28. To request a file, the Information Service Mainframe 60 must know the DRS server TCP/IP address. The Information Service Mainframe 60 may send the TCP/IP request on a regularly scheduled basis, e.g., on a predetermined day and time. TCP/IP may provide data format conversion from ASCII to EBCDIC. Alternatively, according to another method, the DRS server 28 may transmit the subscriber caller data file to the Information Service Mainframe 60 in accordance with FTp on TCP/IP. This method may require that the DRS 28 have a Remote Access ID on the Information Service Mainframe 60. The DRS 28 may send data files to the Information Service mainframe 60 on a regularly scheduled basis, e.g., on a predetermined day and time. TCP/IP will provide data format conversion from ASCII to EBCDIC. Due to security concerns over the integrity of the ISCP 30, the alternative method noted above may be preferred. In other words, it may be more preferable for the ISCP 30 to limit communications with the DRS 28 to outgoing traffic only and, thus, decrease the risk of a security breach of the ISCP 30 environment.

Compiling, Processing, and Assembling Customer Reports

Referring now to FIGS. 4–8, the process for compiling, processing and assembling the subscriber caller data reports at the Information Service Mainframe 60 will be discussed, according to exemplary features of the present invention.

In accordance with an aspect of the present invention, the format of the subscriber caller data report, generated by the Information Service Mainframe 60, may include various elements relating to the call data. For example, the reports may include a report title and include information regarding incoming calls for a specific calendar month. The information may comprise: the total number of calls; the total number of calls quantified by day of the week; the total number of calls quantified by time of day; the total number of calls quantified by area code and exchange (i.e., NPA-NXX); the total number of calls placed from a particular Zip Code+4 area; and the total number of calls quantified by demographic code. The subscriber caller data reports may also include a customer inquiry or account number. In accordance with another aspect of the present invention, the subscriber caller data reports may be maintained on-line at the Information Service Mainframe for a predetermined period of time, e.g., 90 days, so that personnel can respond to customer inquiries. In such a case, service personnel could access the reports based on the customer's inquiry or account number.

Figure 4:
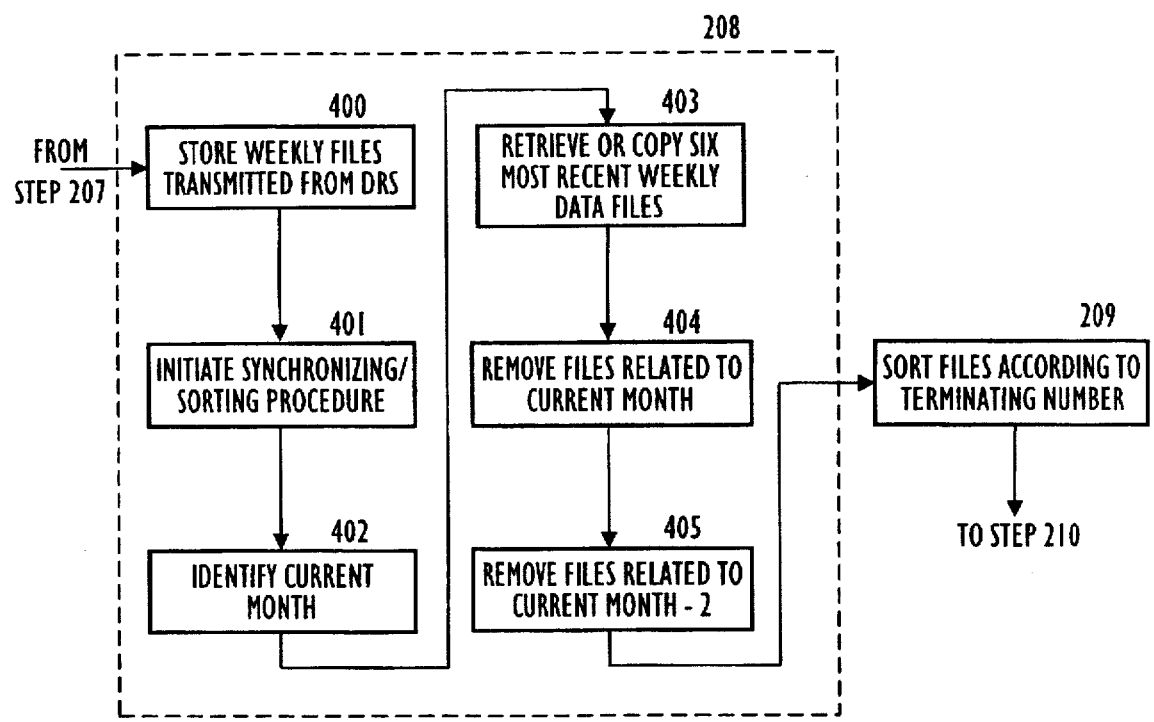
FIG. 4 shows a block diagram of the operation of the Information Service Mainframe, according to the present invention.

Referring to FIG. 4, a more detailed block diagram of the logic flow for the storage at the Information Service Mainframe 60 of the transmitted data files at step 208 (see FIG. 2) is provided. As discussed above with reference to FIG. 2, after the DRS 28 has collected the call related data, the DRS at step 207 may transmit the data in accordance with a File Transport protocol (FTP) or a Transmission Control protocol/Internet protocol (TCP/IP) over a communication line 66 to the Information Service Mainframe 60. At step 208, the transmitted data is then stored in a data file of the Information Service Mainframe 60. Steps 400–405 of FIG. 4 illustrate an exemplary embodiment for storing and processing the transmitted data at the Mainframe 60.

At step 400, the Information Service Mainframe 60 may receive the composite weekly data file transmitted from the DRS 28 and store the file in a database (not shown) of the Mainframe. The database may be adapted to have a sufficient storage capacity for the composite weekly files from the current month, as well as for one or more of the previous months. For example, the database of the Information Service Mainframe 60 may have the capacity to store at least six composite weekly data files, so that a report may also be generated for the previous month. The database of the Mainframe 60 may be maintained periodically so that the weekly composite files from previous reported months are purged and/or archived.

At step 401, a synchronization or sorting procedure may then be initiated by the Information Service Mainframe 60 in order to extract all of the necessary call data from the stored composite weekly files for reporting the previous month to the subscriber. The procedure may be initiated on a predetermined day and time of the month (e.g., the first Monday of each month). After the procedure is initiated, the Information Service Mainframe 60 determines the current month at step 402 and then retrieves or copies the six most recent composite weekly files from the database of the Mainframe at step 403. Thereafter, the Information Service Mainframe 60 extracts at step 404 any data from the retrieved weekly files that are associated with the current month. Based on the determination of the current month (i.e., based on the current month–2months), the Information Service Mainframe 60 then extracts at step 405 the data from the retrieved files that are associated with two months previous. After steps 404 and 405, the modified retrieved composite weekly files will only contain call data for the previous month (i.e., the reporting month) and may then be used to generate the subscribers reports.

For example, assuming that the reporting month is July and that the synchronization and sorting procedure is initiated on the first Monday of August, the Information Service Mainframe 60 at step 402 would determine that the current month is August and would retrieve or copy the six most recent weekly data files in the database at step 403. By retrieving the six most recent weekly files, the Mainframe 60 ensures that records for each day of the previous month will be compiled. Because only one month, e.g., July, is of interest in this data file, any data from the current month, e.g., August, or from the month preceding the data file month, e.g., June, will be ignored and extracted at steps 404 and 405. In such a case, the modified retrieved composite weekly files will only contain call data for the reporting month of July.

After step 405, the modified retrieved composite weekly files may be sorted, for example, by terminating phone number at step 209 and further processed in accordance with steps 210–220, as shown in FIG. 2. As discussed above, the subscriber caller data reports may be produced through a procedure in which the sorted data files and the sorted customer format files are matched. In producing the files, the terminating telephone number of the data files may be matched with the working telephone number of the customer format file. If a match is found, the service may then determine to which of the six categories of report data have been selected by the customer. The customer's subscription may be determined from the customer format file. For example, one or more enable indicators may be included in the customer format file to enable one or more of the six report categories.

Figure 5A:
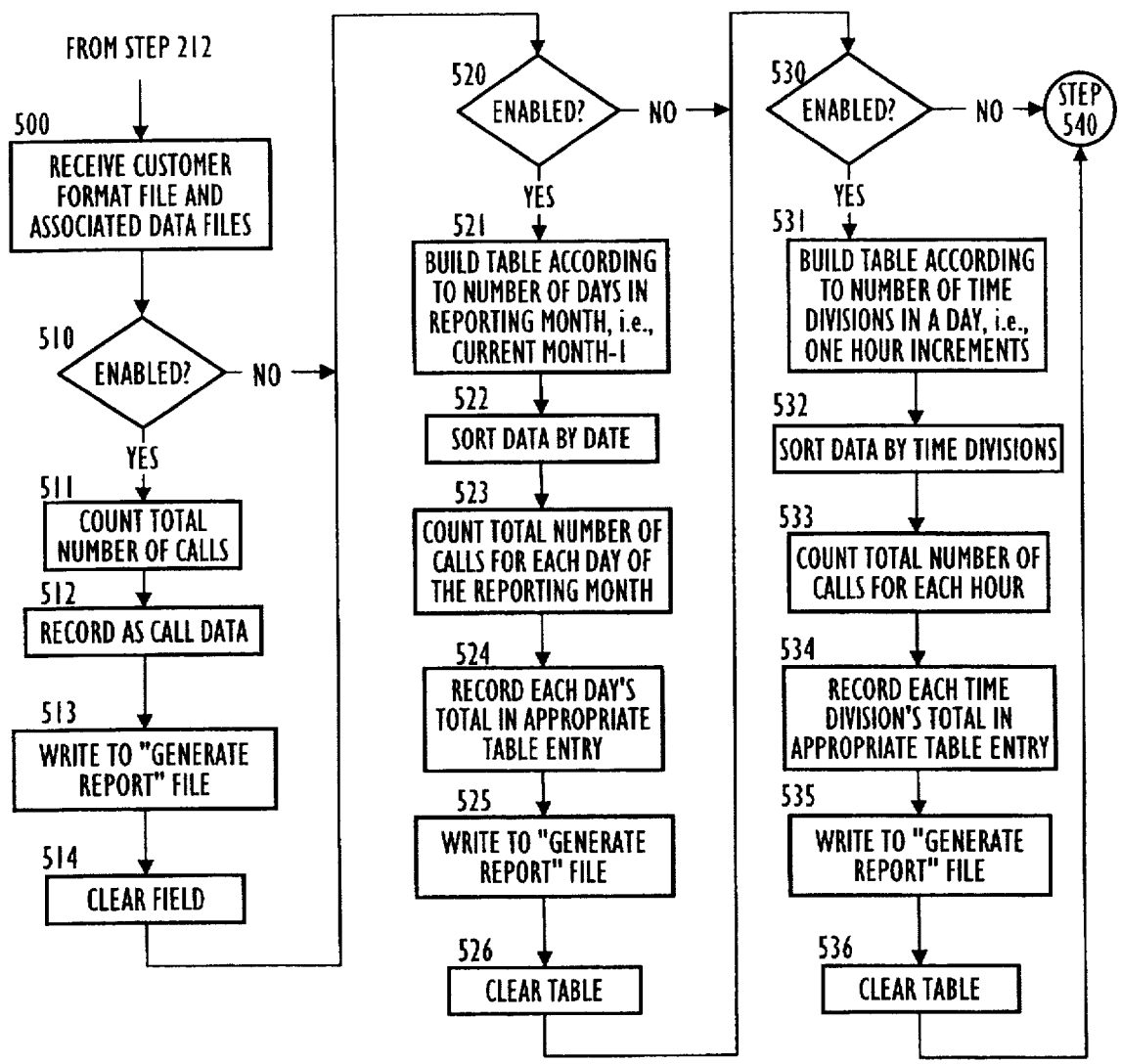
FIGS. 5A and 5B show a block diagram, in accordance with an aspect of the present invention, for detecting and calculating subscriber service data.

Referring to FIG. 5, a block diagram of an exemplary embodiment of the present invention for determining the subscriber services and creating a data entry for each subscribed service (as previously discussed above with reference to steps 216 and 218 of FIG. 2) is provided. As shown in FIG. 2, after the Information Service Mainframe 60 determines at step 212 that a grouped data file is associated with a format file, then processing may continue in order to determine which services the subscriber has selected to receive in the subscriber's report. In accordance with the embodiment of FIG. 5, the Information Service Mainframe 60 may retrieve the customer's format file and all matching data files at step 500, and then determine at step 510 whether an indicator for Total Number of Calls is enabled in the customer's format file. If the Total Number of Calls indicator is not enabled, then logic flow may proceed to step 520. However, if the Total Number of Calls indicator is enabled, then the Information Service Mainframe 60 will count the total number of calls in the data files associated with the subscriber at step 511 and record the calculated total at step 512. Thereafter, the Information Service Mainframe 60 may write at step 513 the total number of calls to an appropriate file in order to later the generate the report at step 220 (see FIG. 2). The Information Service Mainframe 60 then clears the counting field at step 514, and logic flow proceeds to step 520.

At step 520, the customer format file may be checked in order to determine whether the indicator for Calls by Day of the Month has been enabled. If the Information Service Mainframe 60 determines that the Calls by Day of the Month indicator is not enabled, then logic flow may proceed to step 530. However, if the Calls by Day of the Month indicator is enabled, then the Information Service Mainframe 60 may build a data table according to the number of days in the recording month (i.e., the previous month at step 521). The data files may then be sorted by date at step 522 and the total number of calls for each day of the reporting month is calculated at step 523. The total calculated for each day may be recorded in the table at step 524 and upon completion of the table entries, the table may be written at step 525 to the appropriate file to later generate the report at step 220. Thereafter, the Information Service Mainframe 60 may clear the data table and field at step 526, and the procedure may continue to step 530.

At step 530, the Information Service Mainframe 60 may search the customer format files to determine whether the Total Number of Calls by Hour of the Day indicator has been enabled. If the indicator has not been enabled, the procedure may proceed to step 540. However, if the Information Service Mainframe 60 determines that the indicator is enabled, a data table may be built at step 531 according to, e.g., the number of hours per day (although any other divisions may be used as a substitute). The Mainframe 60 may then sort the customer data files by time at step 532 and, thereafter, the total number of calls for each time division may be calculated at step 533. The calculated values may then be recorded in the data table at step 534 and written at step 535 to the appropriate file to generate the report. The data table and field may then be cleared at step 536 and the procedure may proceed to step 540.

At step 540, the procedure may determine whether the Total Number of Calls by NPA-NXX indicator is enabled in the customer format file. If the indicator has not been enabled, the procedure may go to step 550. However, if the Mainframe 60 determines that the Total Number of Calls by NPA-NXX indicator has been enabled, the Mainframe may numerically sort the data files according to originating telephone number (e.g., by the NPA-NXX of the calling party) at step 542. If an originating NPA-NXX is unavailable, a default entry may be used. At step 543, the Mainframe 60 may determine the location by State (e.g., Virginia, Texas, etc.) of the originating call. For this purpose, a look-up table may be utilized which associates each NPA with a State name. The State name and the associated NPA may then be written at step 544 to an appropriate file for later generating the reports. At step 545, another look-up table may be accessed by the Mainframe 60 to determine the town name (or exchange) of the originating call (e.g., Fairfax, Houston, etc.) based on the NPA-NXX (or NXX within the identified NPA). The town name (or exchange) and the NXX(s) may also be written at step 546 to a file for the generation of reports at step 220. The NPA relates to area code, and denotes the State of origin of the call. The NXX relates to the central office designation, denoting the locality, town, or exchange of origin of the call. The data files may then be sorted according to NPA-NXX for each State and town name at step 547 and the total number of calls originating from each NPA-NXX within a particular town may be calculated and recorded at step 548. At step 548, the Information Service Mainframe may also write the calculated totals to an appropriate file for subsequent generation of the reports. Thereafter, the data field for calculating the number of calls is cleared at step 549, and the procedure may go to step 550.

At step 550, the Information Service Mainframe 60 may determine whether the Total Number of Calls by Zip Code+4 indicator has been enabled. If the indicator has not been enabled, the procedure may go to step 560. However, if the Total Number of Calls by Zip Code+4 indicator has been enabled, then the Mainframe 60 may read the originating telephone number of the calling party from the data files at step 551. Thereafter, a sort file for storing records of each call made to the working number (i.e., the subscriber's number) may be created at step 552. The sort file may include the originating telephone number determined at step 551 and the associated Zip Code+4 later determined at step 555 (see below).

The Mainframe 60 may then locate the originating number (of the calling party/network user) in a network user identification table at step 553. In accordance with the present invention, a network user identification table may be stored in a database of the Mainframe 60 and contain identification numbers or codes associated with each network user based on the originating number. At step 554, the identification number or codes associated with the originating number may then be used to access a network user database from the Mainframe 60. The network user database may include, for example, the name, address, Zip Code+4, and a demographic code associated with the network user who originated the call to the subscriber.

The Zip Code+4 area is a division within a particular Zip Code established by the U.S. Postal Service. The Zip Code +4 data associated with the calling party may be read at step 555 from the network user database based on the identification number for the originating number. The Zip Code+4 data may also be written to the sort file. As such, the network user identification number and the network user database tables may be employed by the Information Service Mainframe 60 to the determine the Zip+4 area for each originating number at step 555. As noted above, the Zip Code+4 may be made up of, for example, a predetermined field within a network user database. The originating number, read in step 551, may be used to determine the network user identification number or code at step 553. Alternatively, the network user database and network user identification table may be combined so as to identify the Zip Code+4 of the originating party according to the originating telephone number in a unitary step.

At step 556, an internal sort may be performed on the sort files so that all call data records for each Zip Code+4 division may be compiled together to determine the total number of calls generated from each Zip Code+4 identified by the Mainframe 60. The total number of calls for each Zip Code +4 may be calculated at step 557 and written to an appropriate file for subsequent generation of the subscribers' reports at step 558. The tables and files created in steps 552 and 556 may then be cleared at step 559 and, thereafter, the procedure may then proceed to step 560.

The network user database noted above will normally contain billing information for customers of the regional telephone company only and, thus, data records for calls originating within the regional telephone company's operating territory may only be available. If a call originating within the regional telephone company telephone operating territory cannot be found within the network user database, then the Zip Code+4 field may be set to a default value, indicating an unknown value.

At step 560, the Information Service Mainframe 60 may determine whether the Total Number of Calls by Demographic Code indicator has been enabled. If the indicator has not been enabled, the procedure may go to step 220 to produce the subscribers' reports (see FIG. 2). However, if the Total Number of Calls by Demographic Code indicator has been enabled, then the Mainframe 60 may read the originating telephone number from the call related data files at step 561. Thereafter, a sort file for each call made to the working number (i.e., the subscriber's number) may be created at step 562. The sort file may include the originating telephone number determined at step 561 and the associated demographic code later determined at step 565 (see below).

At step 563, the Mainframe 60 may then locate the originating number in a network user identification table. Once again, a network user identification table may be utilized that is stored in a database of the Mainframe 60. The network user identification table may contain the identification numbers or codes associated with each network user. At step 564, the identification number or codes associated with the originating number may then be used to access a network user database from the Mainframe 60. The network user database may include, for example, the name, address, Zip Code+4, and a lifestyle demographic consumer segmentation scheme code (i.e., a demographic code). Each demographic code can indicate specific demographic data relating to the network user. The demographic data may include census variables, i.e., family size, income level, profession, education, etc., and credit information. The demographic data may also breakdown the populace according to, e.g., region, Zip Codes, or Zip Code+4. Other information, such as the status of the calling party (e.g., whether the network user is a business) may also be indicated by the demographic code. Commercially available demographic codes and data may be utilized, such as that provided by, e.g., Equifax National Decision Systems, Donnelly, and Claritas. The demographic code may be made up of, for example, a predetermined field within a network user database.

Therefore, if the Total Number of Calls by Demographic Code indicator is enabled at step 560, a record may be written to a sort file for each call made to the working number (i.e., subscriber's number) at step 562. The originating number, read in at step 561, may be used to determine the network user identification number or code at step 563. The network user identification number and the network user database may then be employed to determine the demographic code for each originating number at step 565. Alternatively, the network user database and network user identification table may be combined so as to identify the demographic code of the originating party according to the originating telephone number in a unitary step. After the demographic code is read at step 565, the demographic code may be written to the sort file.

Figure 5B:
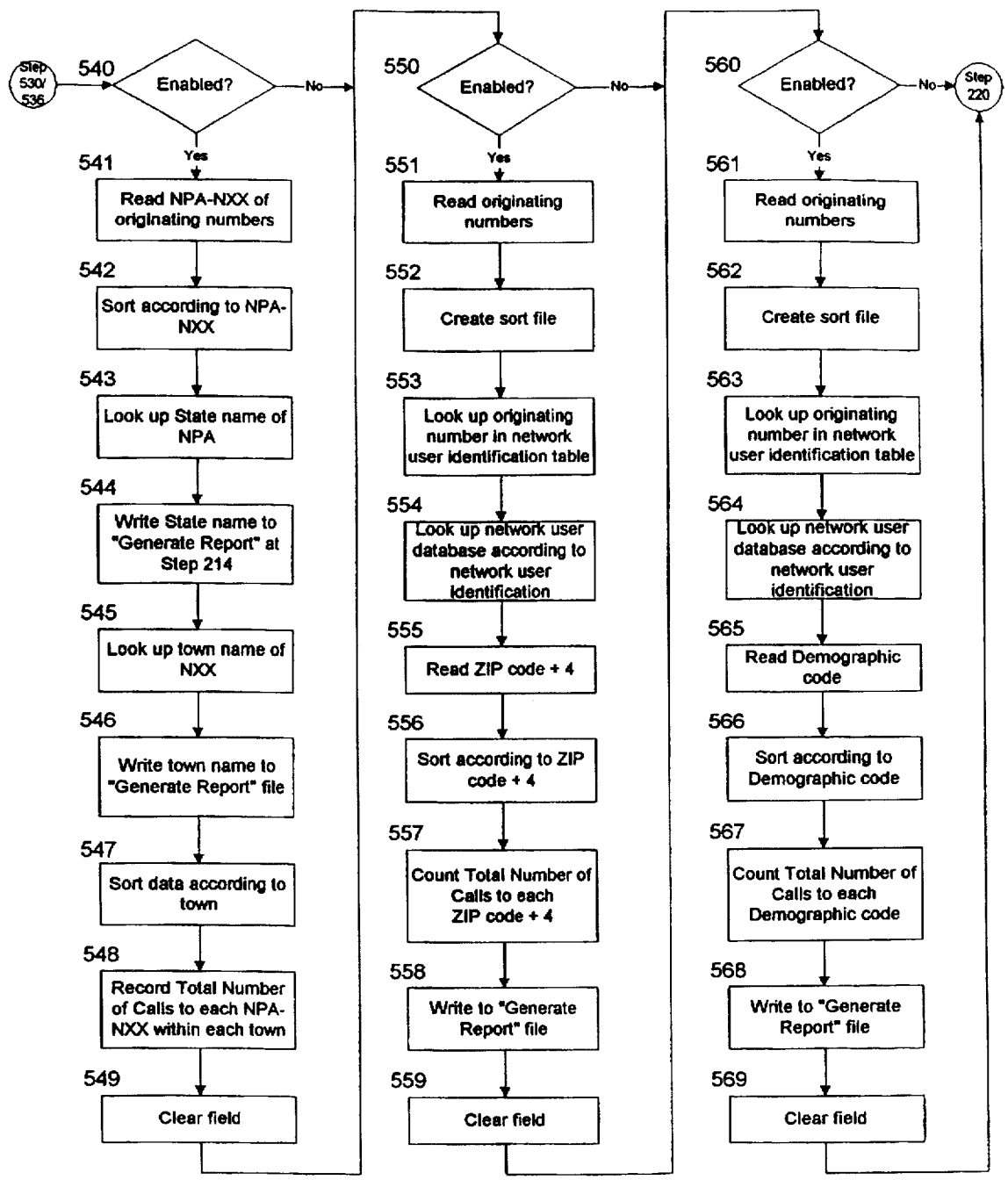
Figure 9:
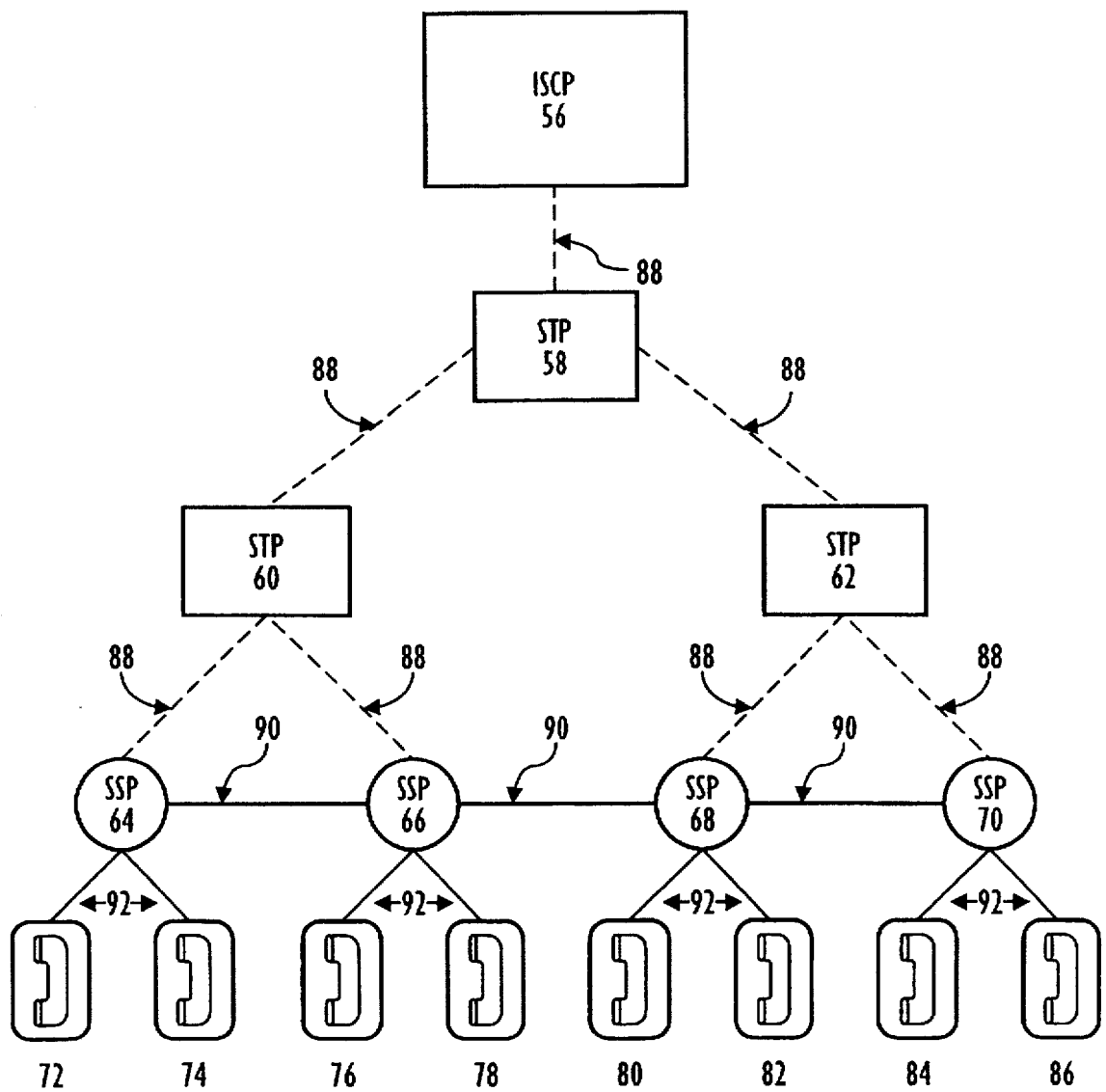
FIG. 9 is a block diagram of the basic components of an Advanced Intelligent Network (AIN) system.

As shown in FIG. 5B, an internal sort may be performed at step 566 so that all the data files for each demographic code may be compiled together to determine the total number of calls generated from each demographic code identified by the Mainframe 60. The total number of calls from each demographic code may be calculated at step 567 and written at step 568 to an appropriate file for subsequent generation of the subscribers' reports. Thereafter, the files created at steps 562 and 566 may be cleared at step 569, and the Mainframe 60 may then proceed to step 220 (see FIG. 2) to generate the reports.

The network user database noted above will normally contain billing information for customers of the regional telephone company only and, thus, data records for calls originating within the regional telephone company's operating territory may only be available. If a call originating within the regional telephone company operating territory cannot not be found within the network user database, then the demographic code may be set to a default value, indicating an unknown value.

Once the customer format files and modified retrieved composite weekly files are matched at step 212 and the categories of data have been processed at steps 216 and 218, the subscriber caller data reports may be produced at step 220. The subscriber has the option of receiving the report on paper, computer diskette, or any other medium. The customer's preference for the report may be part of the customer format file, and the Information Service Mainframe 60 may provide the output report on the requested medium.

FIGS. 6A and 6B show an example of an optional paper printout of a caller data service report that may be provided to a subscriber. The format of the report in FIGS. 6A and 6B includes areas for indicating the total number of calls, the quantity of calls by day of the month, the quantity of calls by hour of day, the quantity of calls by demographic code, the quantity of calls by NPA-NXX and the quantity of calls by Zip Code+4. The report also indicates the reporting period (i.e., Jul. 1, 1994 –Jul. 31, 1994), the run date of the report (i.e., Aug. 5, 1994) and the subscriber's or working telephone number (i.e., 316-555-1234). Other report formats, different from that illustrated in FIGS. 6A and 6B, may be utilized according to what report categories are specified by the subscriber.

In addition to providing a hardcopy printout of the report, subscribers may also be provided with a copy of the report on diskette. The diskette may contain the data from the report in an appropriate format so that it may be read and displayed by a computer at the subscriber's premises. For example, as shown in FIGS. 7A and 7B, the diskette may contain an ASCII text file in a comma delimited format. In such a case, a spreadsheet program (e.g., Lotus 1-2-3, Excel, Quattro pro, etc.) running on the subscriber's computer may use the ASCII text file as input to produce an output as shown in FIG. 8. As illustrated in FIG. 8, the output file may contain a title report and column headings for each of the data categories specified by the subscriber. In the alternative, the column headings may be provided for all data categories with only the data from the subscriber specified categories being displayed.

It is noted that the foregoing examples have been provided merely for the purpose of explanation and are in no way to be construed as limiting the present invention. While the invention has been described with reference to a preferred embodiment, it is understood that the words which have been used herein are words of description and illustration, rather than words of limitation. Further changes may be made, within the purview of the appended claims, as presently stated and as amended, without departing from the scope and spirit of the invention in its aspects. In addition, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A method for producing a record of calls to a subscriber in an advanced intelligent network, said advanced intelligent network comprising a two-way communication network interconnecting a plurality of service switching points in a plurality of dispersed network locations, said service switching points selectively establishing a communication connection between at least two of said network locations in response to a call request from a calling party, and a service control point comprising a called party call processing record including service logic to initiate recording of incoming call data in response to the call request from the calling party to establish communication with said subscriber, said method comprising:

collecting and recording call data at said service control point in response to said call request from said calling party to establish communication with said subscriber, said call data comprising a calling party number of said calling party and a terminating number of said subscriber;

accumulating and storing said call data according to a plurality of selectable report formats, said plurality of selectable report formats being enabled by service enabling data and including a total number of calls based on a demographic code representing demographic data associated with said calling party; and thereafter, periodically producing a caller data service report based on said call data accumulated and stored according to said demographic code and said plurality of selectable report formats.

2. The method according to claim 1, wherein said plurality of selectable report formats further comprises one or more of a total number of calls, a total number of calls by day of month, a total number of calls by hour of day, a total number of calls by local exchange, and a total number of calls by Zip Code+4.

3. The method according to claim 1, further comprising:
determining whether said service enabling data enables reporting a total number of calls for a predetermined period;
calculating the total number of calls to said terminating number of said subscriber during said period; and
recording said total number of calls.

4. The method according to claim 1, further comprising:
determining whether said service enabling data enables reporting a total number of calls by day of a month;
creating a table with an entry corresponding to each day of said month;
calculating a total number of calls to said terminating number of said subscriber for each day; and
recording said total number for each day.

5. The method according to claim 1, further comprising:
determining whether said service enabling data enables reporting a total number of calls by hour of a day;
creating a table with an entry corresponding to each hour of said day;
calculating a total number of calls to said terminating number of said subscriber for each hour; and recording said total number for each hour to a recording means.

6. The method according to claim 1, further comprising:
determining whether said service enabling data enables reporting a total number of calls by NPA-NXX;
reading a NPA associated with said calling party number of said calling party;
identifying a State of origin of said calling party number based on said NPA;
reading a NPA-NXX associated with said calling party number of said calling party;
identifying a town of origin of said calling party number based on said NPA-NXX; and
recording a total number of calls according to said town and state of origin.

7. The method according to claim 1, further comprising:
determining whether said service enabling data enables reporting a total number of calls by Zip Code+4;
accessing a network user database based on said calling party number of said calling party, said network user database comprising a Zip Code+4 associated with said calling party;
reading said Zip Code+4 associated with said calling party;
calculating a total number of calls to said terminating number of said subscriber by Zip Code+4; and
recording said total number of calls.

8. The method according to claim 1, further comprising:
determining whether said service enabling data enables reporting a total number of calls by demographic code;
accessing a network user database based on said calling party number of said calling party, said network user database comprising a demographic code associated with said calling party;
reading said demographic code associated with said calling party;
calculating a total number of calls to said terminating number of said subscriber by demographic code;
recording said total number of calls.

9. The method according to claim 1, wherein said caller data service report is produced in a format based on said service enabling data.

10. The method according to claim 1, further comprising:
transferring said call data that is collected and recorded at said service control point to a remote processing unit, said call data being accumulated and stored according to said plurality of selectable report formats at said remote processing unit.

11. The method according to claim 1, wherein said step of accumulating and storing said call data comprises:
recording daily call data associated with service requests to establish communication with said subscriber;
combining said recorded daily call data with previously recorded daily call data on a weekly basis; and
storing said combined daily call data as a composite weekly call data file.

12. The method according to claim 11, further comprising:
identifying a current month;
collecting all of said daily call data for a month immediately preceding said current month;
identifying said terminating number of said subscriber within said call data; and recording said monthly call data associated with said terminating number identified.

13. The method according to claim 12, said step of collecting said call data comprising:
    combining the six most recent weekly call data files;
    removing, from said combined call data files, any call data related to said current month;
    removing, from said combined call data files, any call data related to a month which precedes said current month by two months, leaving only call data related to the previous month in said combined call data files; and
    recombining and recording said remaining call data.

14. The method according to claim 1, wherein said step of producing said caller data service report includes producing said report on one of paper or diskette.

15. The method according to claim 1, wherein said collecting and recording of said call data includes collecting and recording local exchange traffic.

16. An apparatus for producing a record of calls to a subscriber in an advanced intelligent network, the advanced intelligent network comprising a two-way communication network interconnecting a plurality of service switching points and a plurality of dispersed network locations, said service switching points selectively establishing a communication connection between at least two of said network locations in response to a call request from a calling party, and a service control point comprising a called party call processing record including service logic to initiate recording of incoming called data in response to the call request from the calling party to establish communication with said subscriber, said apparatus comprising:
    means for collecting and recording call data at said service control point in response to said call request from said calling party to establish communication with said subscriber, said call data comprising a calling party number of said calling party and a terminating number of said subscriber;
    means for accumulating and storing said call data according to a plurality of selectable report formats, said plurality of selectable report formats being enabled by service enabling data and including a total number of calls based on a demographic code representing demographic data associated with said calling party; and
    means for producing a caller data service report based on said call data accumulated and stored according to said demographic code and said plurality of selectable report formats.

17. The apparatus according to claim 16, wherein said plurality of selectable report formats further comprises one or more of a total number of calls, a total number of calls by day of month, a total number of calls by hour of day, a total number of calls by local exchange, and a total number of calls by Zip Code+4.

18. The apparatus according to claim 16, further comprising:
    means for determining whether said service enabling data enables reporting a total number of calls for a predetermined period;
    means for calculating the total number of calls to said terminating number of said subscriber during said period; and
    recording said total number of calls.

19. The apparatus according to claim 16, further comprising:
    means for determining whether said service enabling data enables reporting a total number of calls by day of a month;
    means for creating a table with an entry corresponding to each day of said month;
    means for calculating a total number of calls to said terminating number of said subscriber for each day; and
    means for recording said total number for each day.

20. The apparatus according to claim 16, further comprising:
    means for determining whether said service enabling data enables reporting a total number of calls by hour of a day;
    means for creating a table with an entry corresponding to each hour of said day;
    means for calculating a total number of calls to said terminating number of said subscriber for each hour; and
    means for recording said total number for each hour to a recording means.

21. The apparatus according to claim 16, further comprising:
    means for determining whether said service enabling data enables reporting a total number of calls by NPA-NXX;
    means for reading a NPA associated with said originating number of said calling party;
    means for identifying a State of origin of said calling party number based on said NPA;
    means for reading a NPA-NXX associated with said calling party number of said calling party;
    means for identifying a telephone exchange of origin of said calling party number based on said NPA-NXX; and
    means for recording a total number of calls according to said telephone exchange and state of origin.

22. The apparatus according to claim 16, further comprising:
    means for determining whether said service enabling data enables reporting a total number of calls by Zip Code+ 4;
    means for accessing a network user database based on said calling party number of said calling party, said network user database comprising a Zip Code+4 associated with said calling party;
    means for reading said Zip Code+4 associated with said calling party;
    means for calculating a total number of calls to said terminating number of said subscriber by Zip Code+4; and
    means for recording said total number of calls.

23. The apparatus according to claim 16, further comprising:
    means for determining whether said service enabling data enables reporting a total number of calls by demographic code;
    means for accessing a network user database based on said calling party number of said calling party, said network user database comprising a demographic code associated with said calling party;
    means for reading said demographic code associated with said calling party;
    means for calculating a total number of calls to said terminating number of said subscriber by demographic code;
    means for recording said total number of calls.

24. The apparatus according to claim 16, wherein said caller data service report is produced in a format based on said service enabling data.

25. The apparatus according to claim 16, further comprising:
  means for transferring said call data that is collected and recorded at said service control point to a remote processing unit, said call data being accumulated and stored according to said plurality of selectable report formats at said remote processing unit.

26. The apparatus according to claim 16, wherein said means for accumulating and storing said call data comprises:
  means for recording daily call data associated with service requests to establish communication with said subscriber;
  means for combining said recorded daily call data with previously recorded daily call on a weekly basis; and
  means for storing said combined daily call data as a composite weekly call data file.

27. The apparatus according to claim 26, further comprising:
  means for identifying a current month;
  means for collecting all of said daily call data for a month immediately preceding said current month;
  means for identifying said terminating number of said subscriber within said call data; and
  means for recording said monthly call data associated with said terminating number identified.

28. The apparatus according to claim 27, said step of collecting said call data comprising:
  means for combining the six most recent weekly call data files;
  means for removing from said combined call data files any call data related to said current month;
  means for removing from said combined call data files any call data related to a month which precedes said current month by two months, leaving only call data related to the previous month remaining in said combined call data files; and
  means for recombining and recording said remaining call data.

29. The apparatus according to claim 16, wherein said means for producing said caller data service report includes means for producing said report on one of paper or diskette.

30. The apparatus according to claim 16, wherein said means for collecting and recording of said call data includes collecting and recording local exchange traffic.

31. The method according to claim 1, further comprising:
  determining whether said service enabling data enables reporting a total number of calls indicated as private calls by a privacy indicator;
  creating a table with an entry corresponding to each of said private calls;
  calculating a total number of said private calls routed to said terminating number of said subscriber; and
  recording said total number.

32. The method according to claim 11, said call data further comprising a privacy indicator, said privacy indicator being selectively forwarded by said calling party to preclude said accumulating of said calling party number, and wherein said step of recording daily call data further comprises collecting said privacy indicator.

33. The method according to claim 32, further comprising the step of assigning a predetermined character to replace said calling party number when said privacy indicator is entered by said calling party.

34. The method according to claim 33, further comprising:
  identifying a current month;
  collecting all of said daily call data for a month immediately preceding said current month;
  identifying said terminating number of said subscriber within said call data; and
  recording said monthly call data associated with said terminating number identified.

35. The method according to claim 34, said step of collecting said call data comprising:
  combining the six most recent weekly call data files;
  removing, from said combined call data files, any call data related to said current month;
  removing, from said combined call data files, any call data related to a month which precedes said current month by two months, leaving only call data related to the previous month remaining in said combined call data files; and
  recombining and recording said remaining call data.

36. The method according to claim 35, wherein said privacy indicator comprises additional digits entered by said calling party during said call request.

37. The apparatus according to claim 16, further comprising:
  means for determining whether said service enabling data enables reporting a total number of calls indicated as private calls by a privacy indicator;
  means for creating a table with an entry corresponding to each of said private calls;
  means for calculating a total number of said private calls to said terminating number of said subscriber; and
  means for recording said total number.

38. The apparatus according to claim 26, said call data further comprising a privacy indicator, said privacy indicator being selectively entered by said calling party to preclude said accumulating and storing means from accumulating said calling party number, and wherein said means for recording daily call data further comprises means for collecting said privacy indicator.

39. The apparatus according to claim 38, further comprising means for assigning a predetermined character to replace said calling party number when said privacy indicator is entered by said calling party.

40. The apparatus according to claim 39, further comprising:
  means for identifying a current month;
  means for collecting all of said daily call data for a month immediately preceding said current month;
  means for identifying said terminating number of said subscriber within said call data; and
  means for recording said monthly call data associated with said terminating number identified.

41. The apparatus according to claim 40, said step of collecting said call data comprising:
  means for combining the six most recent weekly call data files;
  means for removing from said combined call data files any call data related to said current month;
  means for removing from said combined call data files any call data related to a month which precedes said current month by two months, leaving only call data related to the previous month remaining in said combined call data files; and means for recombining and recording said remaining call data.

42. The apparatus according to claim 41, wherein said privacy indicator comprises additional digits entered by said calling party during said call request.

43. An apparatus for producing a record of calls to a subscriber in an advanced intelligent network, the advanced intelligent network comprising a two-way communication network interconnecting a plurality of service switching points and a plurality of dispersed network locations, said service switching points selectively establishing a communication connection between at least two of said network locations in response to a call request from a calling party, and a service control point comprising a called party call processing record including service logic to initiate recording of incoming called data in response to the call request from the calling party to establish communication with said subscriber, said apparatus comprising:

- a collecting and recording system that captures call data at said service control point in response to said call request from said calling party to establish communication with said subscriber, said call data comprising a calling party number of said calling party and a terminating number of said subscriber;
- an accumulating system that produces said call data according to a plurality of selectable report formats, said plurality of selectable report formats being enabled by service enabling logic and including a total number of calls based on a demographic code representing demographic data associated with said calling party; and
- a compiling system for producing a caller data service report based on said call data accumulated and stored according to said demographic data and said plurality of selectable report formats.

44. The apparatus according to claim 43, wherein said plurality of selectable report formats further comprises one or more of a total number of calls, a total number of calls by day of month, a total number of calls by hour of day, a total number of calls by local exchange, and a total number of calls by Zip Code+4.

45. The apparatus according to claim 44, further comprising a service determining system for enabling a reporting of a total number of calls in accordance with one of said plurality of selectable report formats; and

- a call data compiling device for calculating a total number of calls to said terminating number of said subscriber for said one of said plurality of selectable report formats; and
- a recording system for storing said total number of calls.

* * * * *

UNITED STATES PATENT AND TRADEMARK OFFICE
CERTIFICATE OF CORRECTION

PATENT NO. : 5,799,073
DATED : August 25, 1998
INVENTOR(S) : Harold C. FLEISCHER, III et al.

It is certified that error appears in the above-identified patent and that said Letters Patent is hereby corrected as shown below:

At column 28, line 22 (claim 21, line 5) of the printed patent, change "originating" to ---calling party---.

Signed and Sealed this

Nineteenth Day of October, 1999

Attest:

Q. TODD DICKINSON

Attesting Officer

Acting Commissioner of Patents and Trademarks